US010699218B2

(12) United States Patent
Anderson et al.

(10) Patent No.: US 10,699,218 B2
(45) Date of Patent: Jun. 30, 2020

(54) ENERGY ANALYTICS LEARNING MACHINE

(71) Applicant: AKW ANALYTICS INC., New York, NY (US)

(72) Inventors: Roger N. Anderson, New York, NY (US); Boyi Xie, New York, NY (US); Leon L. Wu, New York, NY (US); Arthur Kressner, Westfield, NJ (US)

( * ) Notice: Subject to any disclaimer, the term of this patent is extended or adjusted under 35 U.S.C. 154(b) by 0 days.

(21) Appl. No.: 16/538,189

(22) Filed: Aug. 12, 2019

(65) Prior Publication Data

US 2019/0370690 A1 Dec. 5, 2019

Related U.S. Application Data

(63) Continuation of application No. 15/409,425, filed on Jan. 18, 2017, now Pat. No. 10,430,725.

(60) Provisional application No. 62/350,663, filed on Jun. 15, 2016.

(51) Int. Cl.
G06N 20/00 (2019.01)

(52) U.S. Cl.
CPC .................. G06N 20/00 (2019.01)

(58) Field of Classification Search
None
See application file for complete search history.

(56) References Cited

U.S. PATENT DOCUMENTS

| 8,352,227 | B2 | 1/2013 | Klumpen et al. |
| 8,560,476 | B2* | 10/2013 | Anderson ............. G01V 11/00 703/10 |
| 10,281,447 | B2 | 5/2019 | Chisholm et al. |
| 2014/0157172 | A1 | 6/2014 | Peery et al. |
| 2015/0317589 | A1* | 11/2015 | Anderson ............. G06Q 10/08 705/7.25 |

OTHER PUBLICATIONS

Shang et al., "Data-driven soft sensor development based on deep learning technique," J. Process Control, 2014, pp. 223-233, vol. 24.
(Continued)

Primary Examiner — Stanley K. Hill
(74) Attorney, Agent, or Firm — Im IP Law; Chai Im; C. Andrew Im

(57) ABSTRACT

Energy Analytics Learning Machine (or EALM) system is a machine learning based, "brutally empirical" analysis system for use in optimizing the payout from one or more energy sources. EALM system optimizes exploration, production, distribution and/or consumption of an energy source while minimizing costs to the producer, transporter, refiner and/or consumer. Normalized data are processed to determine clusters of correlation in multi-dimensional space to identify a machine learned ranking of importance weights for each attribute. Predictive and prescriptive optimization on the normalized energy data is performed utilizing unique combinations of machine learning and statistical algorithm ensembles. The unstructured textual energy data are classified to correlate with optimal production to capture the dynamics of one or more energy sources of physically real or theoretically calculated systems to provide categorization results from labeled data sets to identify patterns.

13 Claims, 14 Drawing Sheets

(56) References Cited

OTHER PUBLICATIONS

Agarwal et al., "Analyzing Well Production Data Using Combined-Type-Curve and Decline-Curve Analysis Concepts," SPE Reservoir Eval. & Eng., Oct. 1999, pp. 478-486, vol. 2, No. 5.

Ivanovic et al., "Modern machine learning techniques and their applications," Electronics, communications and Networks IV, Jun. 2015, pp. 833-846.

* cited by examiner

| PALM MAP Tools | | |
|---|---|---|
| Machine Learning Optimizer (1400)<br>• Adaptive stochastic control<br>• Locality sensitive hashing<br>• MapReduce parallelization | Clustering Predictor (1410)<br>• K-means<br>• K-medoids<br>• Region Growing<br>• Non-parametric modeling | Ensemble Prescriptor (1420)<br>• Bagging, mountain climbing<br>• Boosting aggregate classifier<br>• Random forest decision trees<br>• Gradient booster |
| Unstructured Analysis (1401)<br>• Information extraction<br>• Information retrieval<br>• Text mining<br>• Entity recognition<br>• Pattern recognition<br>• Log-rank<br>• Keyword extraction<br>• Semantic analysis<br>• Knowledge discovery<br>• Sentiment analysis<br>• Noisy text processing | Regression Predictor (1411)<br>• Linear regression<br>• Support vector regression<br>• Classification & Regression Trees (CART) | Classification Prescriptor (1421)<br>• Logistic regression<br>• Support vector machine<br>• K-Nearest neighbor<br>• Decision tree modeling<br>• Neural networks / Deep learning |
| | Feature Selector (1412)<br>• Importance Weights<br>• Chi-square goodness of fit<br>• Fischer score probability<br>• Principle components<br>• Wrapper methods | Time Series Prescriptor (1422)<br>• Multivariate time series<br>• Hidden Markov modeling<br>• Non-parametric Bayesian |

Fig. 3

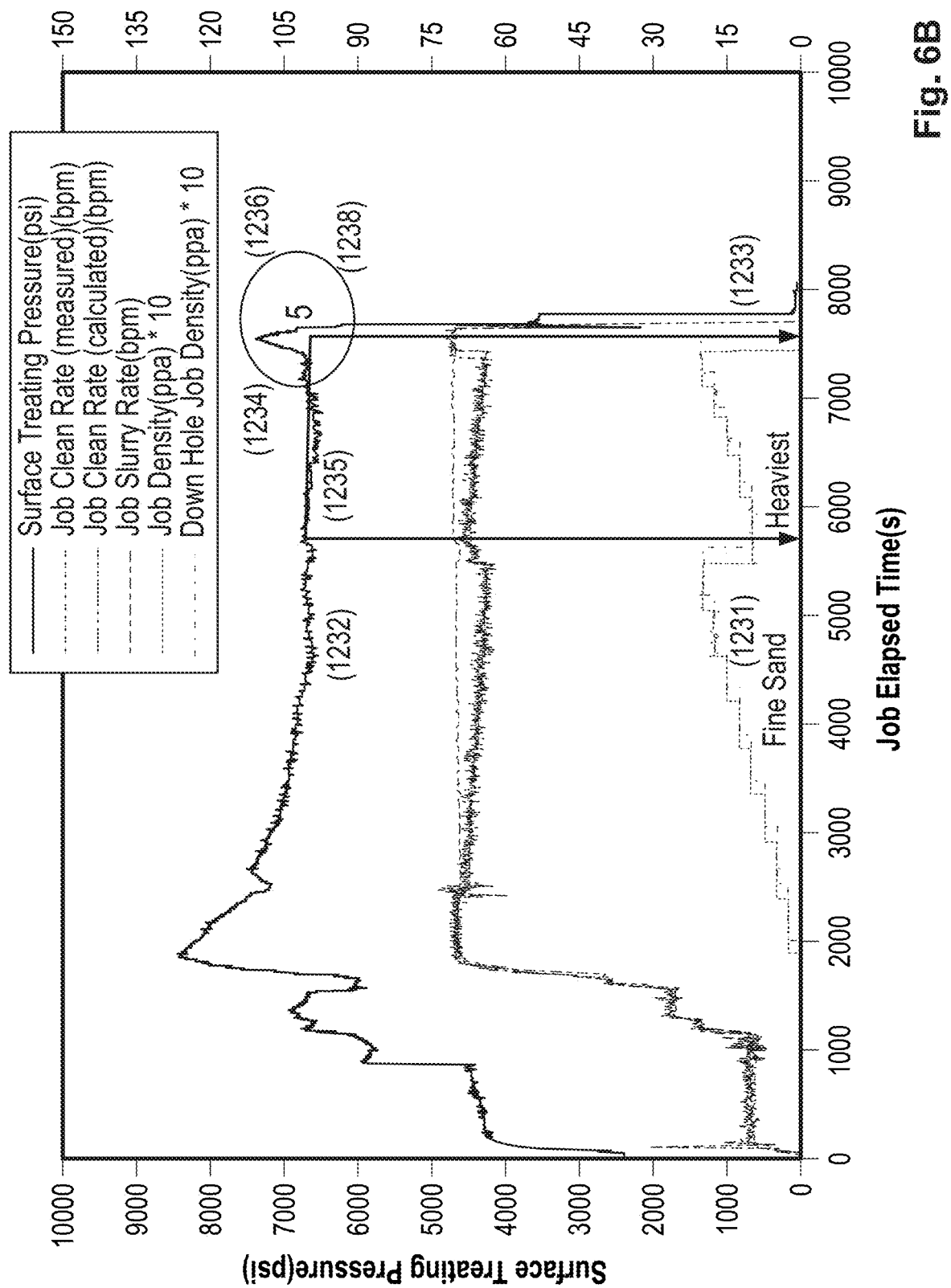

ENERGY ANALYTICS LEARNING MACHINE

RELATED APPLICATION

The present application is a continuation of U.S. application Ser. No. 15/409,425 filed Jan. 18, 2017, which claims the benefit of U.S. Provisional Patent Application Ser. No. 62/350,663 filed Jun. 15, 2016, each of which is incorporated herein by reference in its entirety.

FIELD OF THE INVENTION

The present invention relates to a petroleum analytics learning machine system and method to maximize production from wells of oil and natural gas fields while minimizing costs.

OBJECT AND A SUMMARY OF THE INVENTION

The Petroleum Analytics Learning Machine (PALM) is a machine learning based, "brutally empirical" analysis system for use in all upstream and midstream oil and gas operations. The Petroleum Analytics Learning Machine™ is a trademark of applicant. The objective of the PALM is to become the go-to 'brain' of oil and gas exploration and production, including drilling, completion, and pipeline gathering operations. The PALM was reduced to practice primarily in the new unconventional shale oil and gas play. The PALM analyzed more than 100 attributes integrated from all available data referenced above, in more than 150 horizontal wells and more than 2000 hydraulic fracture (frac) stages that were drilled since 2012 in the wet gas region of the Target Layer shale of Pennsylvania. The PALM was also validated in more than 3000 shale oil wells with more than 10,000 hydraulic fracture stages in the Permian Basin of Texas. In accordance with an exemplary embodiment of the claimed invention, The PALM comprises Machine Analytics Products™ (MAP) Application subsystems (subsystems) that are big-data-centric, using computational machine learning predictive and prescriptive analysis techniques to maximize production of hydrocarbons while minimizing costs of oil and gas upstream exploration and production (E&P) and midstream pipeline operations.

In accordance with an exemplary embodiment of the claimed invention, the PALM comprises MAP subsystems for geology, geophysics, reservoir modeling and rock physics, MAPGEORES; drilling, MAPDRILL; hydraulic fracturing and completions, MAPFRAC; production of hydrocarbons including oil and other liquid condensates, natural gas, and water, MAPPROD; and gathering pipelines and compressor stations, MAPGATHER. In accordance with an aspect of the claimed invention, PALM further comprises other MAP subsystems, such as portfolio management, MAPPORTFOLIO; and others subsystems specifically developed for a customer and the like. These subsystems use the PALM System Integration Database (SID) to retrieve integrated data, then perform machine learning and other statistical analyses of that data, and return to the SID results of computation and predictive and prescriptive actions that can be forwarded by the TOTALVU user interface (UI) to controllers, human and/or automated, so that real-time optimization of production and minimization of costs can be realized for new wells. The unique PALM product suite was developed by inventing scientists and engineers with more than 80 years of combined energy industry expertise, working alongside big data scientists experienced in building real-time decision and control systems. The PALM predictive and prescriptive technologies utilize Support Vector Machine learning, time-series shape recognition, and real-time Random Forest and decision trees to steer hydraulic fractures to become more likely high instead of low producers, stage by stage, as completions of horizontal and vertical shale wells progress. The PALM also uses Support Vector Regression, logistic regression, Bayesian models, nearest neighbors, neural networks and deep learning networks uniquely combined as ensemble learning to weigh the importance of hundreds to thousands of geological, geophysical, and engineering attributes, both measured in the field and computed from theoretical analyses such as reservoir simulation models and 4D seismic and gravity gradiometry monitoring of production changes over time.

In accordance with an exemplary embodiment of the claimed invention, a system and method for optimizing exploration, production and gathering from at least one well to all wells of oil and natural gas fields using a Petroleum Analytics Learning Machine system to maximize production while minimizing costs is provided. Structured digital data and unstructured textual data from geological, geophysical, reservoir modeling simulation, drilling, hydraulic fracturing and completion, and production of crude oil, natural gas, ethane, butane, propane and condensates are collected. Incoming data over a communications network are received and stored into a system integration database by a processor-based server or cloud-based distribution of servers to provide collected data for analyses. The incoming data comprises digital exogenous data, real-time and historical endogenous data, historical data from surrounding production wells, hydraulic fracture completion data, and progress, status and maintenance data from new vertical and horizontal wells, including kickoffs, sidetracks, step-outs, pipeline gathering systems, compressor stations and other kinds of oil and gas sensor data including from public and private data sources now existent and of future design. The time and depth for each data point of the collected data are recorded. The collected data are 'cleaned' to eliminate extraneous and noisy data. The cleaned data are normalized and stored. The normalized data are processed to determine clusters of correlation in multi-dimensional space to identify a machine learned ranking of Importance Weights for each attribute. The Importance Weights are convolved with specific well weights to identifying patterns to enhance production of at least one well or all wells of oil and natural gas fields.

In accordance with an exemplary embodiment of the claimed invention, predictive and prescriptive optimization are performed on the normalized data utilizing unique combinations of machine learning and statistical algorithm ensembles. The ensembles include at least two of the following: linear and non-linear support vector machines and regressions, naïve Bayes, logistic regression, decision trees, hidden Markov models, random forests, gradient boosting machines, neural networks, deep learning networks, among other machine learning models In accordance with an exemplary embodiment of the claimed invention, unstructured textual data are classified to correlate with optimal production by utilizing progressive clustering using region growing from learned seeds, information extraction and retrieval, image recognition, textual mining, keyword and key phrase extraction, semantic and sentiment analysis, entity and pattern recognition and knowledge discovery processing to capture the dynamics of said at least one or all wells of oil and natural gas fields. Categorization and classification results from labeled data sets to identify patterns are provided.

In accordance with an exemplary embodiment of the claimed invention, data and analyses are displayed, recommendations are transmitted, and actual field actions and reactions are received on a graphical user interface on a network-enabled processing device over the communications network. The recommendations are based on the collected data of one or all available wells, or one or more predicted conditions, communications with the one or more of the field systems is automatic, self-driving, autopilot and/or other autonomous means personalized to steer disparate data simultaneously to operators working on vertical and horizontal wells, hydraulic fractures, or other field operations that are needed to improve future production from wells in response to one or more detected trends. One or more predicted conditions, or prescriptive recommendations are displayed on the graphical user interface connected to the Petroleum Analytics Learning Machine system.

In accordance with an exemplary embodiment of the claimed invention, the Petroleum Analytics Learning Machine system utilizes an exploration and production numerical synthesizer of available data from wells in an area or play, in order to score and rank the combined Importance Weights of attributes to predict maximum production at minimum costs when convolved with specific attributes of each well. A real-time synthesizer of the Petroleum Analytics Learning Machine system optimizes drilling to match a designed pathway of a drilled well including hitting one or more target landing zones, while minimizing sinuosity and optimally completing the hydraulic fracturing of horizontal, diagonal and/or vertical components of the drilled wells.

In accordance with an exemplary embodiment of the claimed invention, a real-time processor of the Petroleum Analytics Learning Machine system convolves importance weight values of attributes received by the Petroleum Analytics Learning Machine system from historical data and attribute data from each new well as it progresses in real time to predict future production of the new well before oil and gas are delivered to the surface. The real-time processor utilizes time-series attributes during each hydraulic fracturing stage to automatically classify production effectiveness of each hydraulic fracturing stage and to provide recommendations by self-driving, autopilot and/or other autonomous means to maximize future production of each new well. Preferably, the recommendations are directed to optimization of the production of oil, natural gas, and natural gas liquids while minimizing water production over time.

In accordance with an exemplary embodiment of the claimed invention, the aforesaid system and method receives data from digital field devices into the system integration database. The received data are combined with real time exogenous data comprising weather forecasts. The historical data and the real-time data are fed into a data cleaning system to recognize a quality of the combination with the received data from a comparison with historical performance of at least one of each digital field device and a data stream. The system integration database retrieves, compares and combines geology and geophysics, reservoir modeling, rock properties, drilling, completion, hydraulic fracturing, production and pipeline gathering data into a uniform data repository by linking heterogeneous data sources with normalization based on common unique identifiers. The common unique identifiers comprising at least one of a well name, a well number, a region and geological location of a well, a well depth, time, and a physical property number or unique American Petroleum Institute (API) number, and the geology and geophysics, reservoir modeling, rock properties, drilling, hydraulic fracturing, completion, production, and pipeline gathering data.

In accordance with an exemplary embodiment of the claimed invention, the aforesaid system and method determines clusters of like correlations in one or more well conditions that will likely result in a productive well using the Petroleum Analytics Learning Machine system. The machine learning predicted production volumes of hydrocarbon liquids, gases, and water are generated for each well over time. Identified trends and predicted production conditions are displayed. The Petroleum Analytics Learning Machine system alerts an operator when an anomaly between the predicted production conditions and observed field conditions arise to modify an estimated ultimate recovery.

In accordance with an exemplary embodiment of the claimed invention, the Petroleum Analytics Learning Machine system (PALM) has a coverage of multiple aspects in the analytics. The PALM utilizes at least one of the following regressions: linear regression, support vector regression, classification, regression trees and random forests. The PALM utilizes at one of the following classification: logistic regression, support vector machine and support vector regression, nearest neighbors, decision trees and random forest, neural networks and deep learning networks. The PALM utilizes at least one of the following clustering methods: k-means, k-medoids, expectation-maximization, agglomerative clustering, and nonparametric Bayesian models. The PALM utilizes at least one of the following feature selection and feature engineering processes: information gain, chi-square, principle component analysis, and filter and wrapper feature selection methods. The PALM utilizes at least one the following ensemble methods and models: bagging, boosting, gradient boosting machine, and random forests. The PALM utilizes at least one of the following time series analyses: multivariate time series analysis, hidden Markov models, nonparametric Bayesian models. The PALM system utilizes at least one of the following large-scale or big data analyses: autoregressive integrated moving average (ARIMA), multivariate time series analysis, hidden Markov models, nonparametric Bayesian models, autoregressive conditional heteroskedasticity (ARCH), exponentially weighted moving average, and generalized autoregressive conditional heteroskedasticity (GARCH). The PALM utilizes at least one of the following large-scale or big data analyses: Hadoop MapReduce, Spark, approximation, and locality sensitivity hashing.

In accordance with an exemplary embodiment of the claimed invention, the aforesaid system and method recommends a shut-in, cessation or abandonment of a well in response to a determination by the Petroleum Analytics Learning Machine system that anomalous conditions cannot be economically corrected.

In accordance with an exemplary embodiment of the claimed invention, the aforesaid system and method receives at least one of historical exogenous data, real-time exogenous data and the real-time endogenous data of said each well over a secure wireless or wired network. The historical exogenous data and the real-time exogenous data include at least one of historical weather data, forecast weather data, and production data from surrounding wells under similar historical conditions; and computing forecast of future product for said each well.

In accordance with an exemplary embodiment of the claimed invention, the aforesaid system and method queries one or more system integration databases of multiple surrounding wells in an area or querying one integrated master system integration database comprising regionally relevant geologic and geophysical data, reservoir models, drilling data, hydraulic fracturing data, the historical exogenous data, the real-time exogenous data, and the real-time endogenous data to forecast production of said each well.

In accordance with an exemplary embodiment of the claimed invention, the aforesaid exploration and production synthesizer of the Petroleum Analytics Learning Machine system independently computes at least one of the following actions: steering of a new horizontal well within a preferred geological landing zone target, planning and execution of each stage and perforation density and spacing, and a hydraulic fracturing design and sand proppant volume over time that positively affects production decisions using real-time decision trees and random forests during each hydraulic fracture.

In accordance with an exemplary embodiment of the claimed invention, the aforesaid the exploration and production synthesizer of the Petroleum Analytics Learning Machine system utilizes a support vector regression to estimate relative importance weights of attributes inputted into the Petroleum Analytics Learning Machine system and a linear regression to assign a positive or negative correlation sign to product for each weight. The attributes comprise: relevant geological and geophysical data; reservoir modeling results and calculations, including correction factors and assumptions; rock property measurements including poisons ratio, young's module, gamma ray radioactivity, organic and British Thermal Unit (BTU) content; and combining parameters of the support vector regression and linear regression to enable construction of tornado diagrams representing visually the importance weights of each attribute that correlates with a positive production prediction result and the importance weights of each attribute that correlates with a negative production prediction result for all wells in the area or play.

In accordance with an exemplary embodiment of the claimed invention, the aforesaid the real-time processor convolves f and g, where f is the importance weight values of attributes computed by the Petroleum Analytics Learning Machine system from historical data from all the wells in the area or play and g is each attribute value specific to a well as it progresses. The f*g is an integral transform of a product of two functions as attributes specific to said well, and the integral transform predicts the future production of said well before the oil and gas are delivered to the surface.

In accordance with an exemplary embodiment of the claimed invention, the aforesaid system and method manages one or more prescriptive analytics calculations to maximize production of liquids, and gases and to minimize production of water while minimizing the costs by the exploration and production synthesizer. The aforesaid exploration and production synthesizer computes multiple learning models operatively coupled to the system integration database and receives collected data from the field in real time in an exit poll like voting procedure by the Petroleum Analytics Learning Machine system. The aforesaid system and method generates at least one predicted condition by the Petroleum Analytics Learning Machine system, and stores resulting changes in operations in the system integration database from field operations in response to a recommended action.

In accordance with an exemplary embodiment of the claimed invention, the aforesaid real-time synthesizer of the Petroleum Analytics Learning Machine system independently monitors drilling data. At least one of the following surveys comprises the drilling data: measured depth, inclination, azimuth, total vertical depth, vertical steering, azimuthal departure and dog-leg severity, build rate and turn. At least one of the following parameters comprises the drilling data: weight on bit, rotary torque, circulation rate, measurement while drilling logs such as gamma ray, density and electrical resistivity, differential pounds per square inch, choke position, hook load, flow, alarm states, pump rates, pump strokes, inclination, rotary revolutions per minute, mud viscosity, mud weight, and deviation from a plan. At least one of the following wellbore schematics comprises the drilling data: conductor casing depth, water casing depth, minimum casing depth, surface casing depth, production casing depth, float subs, float collars, float shoes, marker joints, cement design, mud displacement volume, additive types, and additive volumes. In accordance with an exemplary embodiment of the claimed invention, the aforesaid system and method provides real-time recommendations to minimize sinuosity of horizontal wells while maintaining a position within selected landing zones for predetermined distances.

In accordance with an exemplary embodiment of the claimed invention, the aforesaid real-time processor independently monitors the completions data. The completions data comprises perforation depths and time, completions tool use and choke setting. Also, the completions data comprises at least one of the following: time series hydraulic fracture data including surface and downhole pressures, slurry compositions and water mixes, sand volumes, breakdown pressure, proppant concentrations and shut-in pressure for each hydraulic fracture. The aforesaid system and method optimizes a maximum possible production from one or more hydraulic fracturing stages while minimizing its costs by a real-time processing and generation of a predictive machine learning model based on classification of the key attributes determined by the Petroleum Analytics Learning Machine system. A time of a density drop that ends a first sand injection is one of the key attributes. A pressure percentile at the time of the first density drop is one of the key attributes. A time of a density drop that ends a second sand injection with sand larger in diameter and heavier than the sand used in the first sand injection is one of the key attributes. A pressure percentile at the time of the second density drop is one of key attributes. A time of a pressure drop at an end of a shut-in is one of the key attributes. A pressure percentile at the time of the pressure drop at the shut-in is one of the key attributes.

A time of a beginning of a sand change from a lighter to the heaviest sand is one of the key attributes. A pressure percentile at beginning of a heaviest sand density increase is one of the key attributes. A time of a highest pressure after the sand change to the heaviest sand is one of the key attributes. A pressure percentile of a maximum heaviest sand change is one of the key attributes. A slope of a linear regression of a pressure from beginning to end of the heaviest sand injection is one of the key attributes. An intercept of the linear regression of pressure from the beginning of the heaviest sand injection to the highest pressure at the end of the heaviest sand injection is one of the key attributes. A scatter of the linear regression of the pressure from the beginning of the heaviest sand injection to the highest pressure at the end of the heaviest sand injection is another of the key attributes.

In accordance with an exemplary embodiment of the claimed invention, the aforesaid real-time processor generates one or more real-time executable recommendations to a hydraulic fracturing control center. The real-time executable recommendations comprises at least one of the following: a recommended down-hole pressure, a proppant concentration, slurry rate and volume, and a water/sand mix based on at least trends in one or more hydraulic fracturing decision tree and random classifications of historical, highly productive versus low producing stages.

In accordance with an exemplary embodiment of the claimed invention, the aforesaid system and method generates one or more conditions to change real time decisions in the hydraulic fracturing control center based on updated decision trees and random forest predictions that can steer in real time towards a high producing fracture versus a low producing fracture stage.

In accordance with an exemplary embodiment of the claimed invention, the aforesaid real-time processor executes automated time series classification using a machine learning feature recognition to develop clusters of hydraulic fracture classes. The aforesaid real-time processor correlates stages of each class to an average highest production of historical wells. The automated time series classification comprises multiple hydraulic fracture classifications. FracClass 1 is a failure to fracture due to surface equipment failures resulting in no hydraulic fracture and no input to a well production. FracClass 2 is a hydraulic fracture but a subsequent equipment failure either on the surface or down-hole results in a minimal sand displacement and a hydraulic fracture is cut short by an operator, and a current stage is cancelled and moves on to a next stage in the well production plan. FracClass 3 is a successful fracture at extended time and cost, a rapid sand injection results in the well being accidentally packed-off to the surface by an excessive sand buildup. A wellbore is cleanup with water and re-perforated to allow a formation to take scheduled proppant sands in FracClass 3. FracClass 4 is a successful fracture and injection of a full planned for amount of sand, but a late sand placement at an end of a proppant injection results in a pressure surge. In FracClass 4, the heaviest sand injection sand placement is only pack-off locally to a near wellbore annulus of perforations of the current stage and a subsequent water cleanout fails to washout the near wellbore sand placement away from the annulus. FracClass 5 is a perfect hydraulic fracture. In FracClass 5, the full planned amount of the sand is emplaced in a scheduled time, and a subsequent water wash successfully washes the sand from the drill pipe, but also unfortunately the formation in the near wellbore, disrupting connectivity to the hydraulic fracture proppants deeper into the formation.

In accordance with an exemplary embodiment of the claimed invention, the aforesaid real-time processor performs the automated time series classification by discovering sequential patterns and interactions among time series variables utilizing at least one of the following: an autoregressive integrated moving average (ARIMA) model, a multivariate time series analysis, a hidden Markov model, an autoregressive conditional heteroskedasticity (ARCH) model, an exponentially weighted moving average and a generalized autoregressive conditional heteroskedasticity (GARCH) model In accordance with an exemplary embodiment of the claimed invention, the aforesaid real-time processor generates one or more executable recommendations to proceed to a productive hydraulic fracture class mixture based on tornado diagrams utilizing the machine learning to match clusters of attributes of the hydraulic fracture classes that correlate with a maximum production. The aforesaid system and method generates recommended actions to control the hydraulic fracture classes or FracClasses 3 and 4 occurrences as a percentage of the hydraulic fracture class or FracClass 5 of perfect factures. In accordance with an exemplary embodiment of the claimed invention, the aforesaid system and method automatically updates the decision trees to estimate limits of combination of the down-hole pressure, the proppant concentration, the slurry volume and rate, and a sand volume and size based on trends in one or more historical hydraulic fracture successes and failures that occur in each well stage-by-stage, and automatically convey by self-driving, autopilot and/or other autonomous means directions of future actions to the controller of hydraulic fracturing.

In accordance with an exemplary embodiment of the claimed invention, the aforesaid real-time processor stores the hydraulic fracture classes from each new well in the system integration database, thereby enabling subsequent production of liquids, gas and water to be tested against stored hydraulic fracture class mixtures, real-time conditions, and performance measurements as fractures unfold in real-time.

In accordance with an exemplary embodiment of the claimed invention, the aforesaid real-time processor generates one or more hydraulic fracturing conditions that minimizes ideal hydraulic fracturing conditions comprised by at least reducing costs of a service company's time and energy. The aforesaid system and method determines a proppant and water consumption and recommends a decision to proceed or stop said each hydraulic fracturing stage because cost exceeds benefit.

In accordance with an exemplary embodiment of the claimed invention, the aforesaid real-time processor comprises a memory to store computer-executable instructions. The aforesaid real-time processor is coupled to at least one transmitter to communicate with the hydraulic fracturing control center via a bi-directional messaging interface. The aforesaid real-time processor executes the computer-executable instructions to cause the hydraulic fracturing control center (or Frac control center) to perform multiple actions. The hydraulic fracturing control center receives recommendations from the Petroleum Analytics Learning Machine system. The Frac control center generates at least one recommendation to increase production or cut costs of a well in progress by controlling a mix of the hydraulic fracturing class outcome using decision trees of the Petroleum Analytics Learning Machine system to maximize an overall ell production. The Frac control center stores data from actions undertaken based on at least one recommendation in the system integration database to provide a feedback to the Petroleum Analytics Learning Machine system about its recommendations based on the future production.

In accordance with an exemplary embodiment of the claimed invention, the aforesaid real-time processor computes a forecast for production of oil, natural gas, gas liquids, and water for a duration of a profitable history of a well, before delivery of the oil and gas to the surface. The aforesaid real-time processor continuously monitors and updates the production as the well ages. The aforesaid real-time processor provides an estimated ultimate recovery modification recommendations when a deviation from a forecasted, estimated ultimate recovery is predicted.

In accordance with an exemplary embodiment of the claimed invention, the aforesaid real-time processor analyzes a pipeline gathering system that is monitoring data from maintenance and "pigging" (self directed or flowing cylinders of electronics that are pumped through the inside of the pipeline to make measurements of corrosion, fracturing, liquids and water buildup, and other unsafe conditions within the pipeline) and storing it in the system integration database. The monitoring data comprises at least one of the following: time series of nodal pressure, liquids and gas compositions and volumes, maintenance records; and the PALM system identifies correlation clusters to predict optimal pigging schedules and looping directions for highest performance of a pipeline gathering system.

A composite tornado plot is then created for seasons, wet versus dry and hot versus cold. Forecasting of day-ahead and week-ahead pipeline gathering system capacity leads to the identification of maintenance that will prevent the need to shut-in wells because of excessive gathering system capacity. Ranking by section of good to bad performing pipeline sections allows forecasting of susceptibility to liquids trapping, actual versus planned pigging success, witches hat problem events before they happen, and condensate restrictions needed to reduce actual/predicted production.

In accordance with an exemplary embodiment of the claimed invention, the MAP subsystem further comprises an Efficient Frontier Portfolio application to quantify outstanding cost/benefit that will then be calculated by the PALM system. Control is multi-objective; that is, it must optimize a combination of capital cost, reliability, operational cost, safety, as well as profitability, etc. The infrastructure management has to accommodate market signals that are stochastic and other exogenous variables that are also stochastic such as weather and environmental concerns. The state space for control is large, but handled by the PALM machine learning in order to provide optimal cost benefit control of the energy infrastructure of oil and gas fields.

Various other objects, advantages and features of the present invention will become readily apparent from the ensuing detailed description, and the novel features will be particularly pointed out in the appended claims.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein:

FIG. 3 is an illustration of the machine learning optimizer system and machine learning tools common to all MAP subsystems of the PALM system in accordance with an exemplary embodiment of the claimed invention;

FIGS. 6A-B are illustrations of MAPFRAC automated classification of hydraulic fracturing data in accordance with an exemplary embodiment of the claimed invention;

DETAILED DESCRIPTION OF THE EMBODIMENTS

This application incorporates each of the following application by reference in its entirety: U.S. Pat. Nos. 6,826,483, 7,395,252, 8,036,996 B2, and U.S. Pat. No. 8,560,476.

Figure 1:
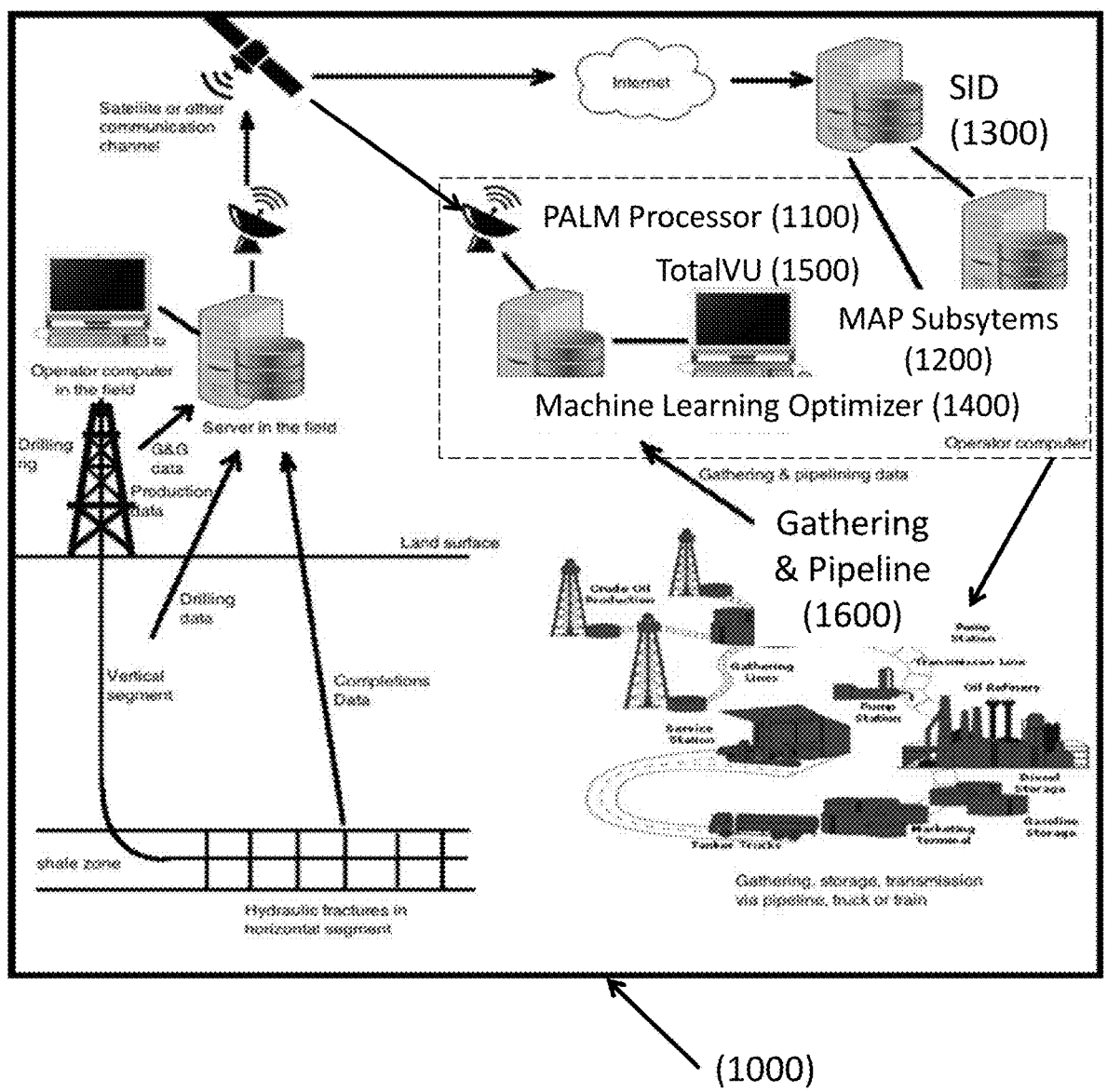
FIG. 1 is an illustration of a system overview of the Petroleum Analytic Learning Machine (PALM) system in accordance with an exemplary embodiment of the claimed invention.

Turning to FIG. 1, there is illustrated a general overview of the system incorporating the PALM 1000. In accordance with an exemplary embodiment of the PALM 1000 comprises a processor 1100, a machine analytics products (MAP) 1200 subsystems, as well as a System Integration Database (SID) 1300, a Machine Learning Optimizer 1400, and a TotalVU controller 1500 providing data visualization.

Figure 2:
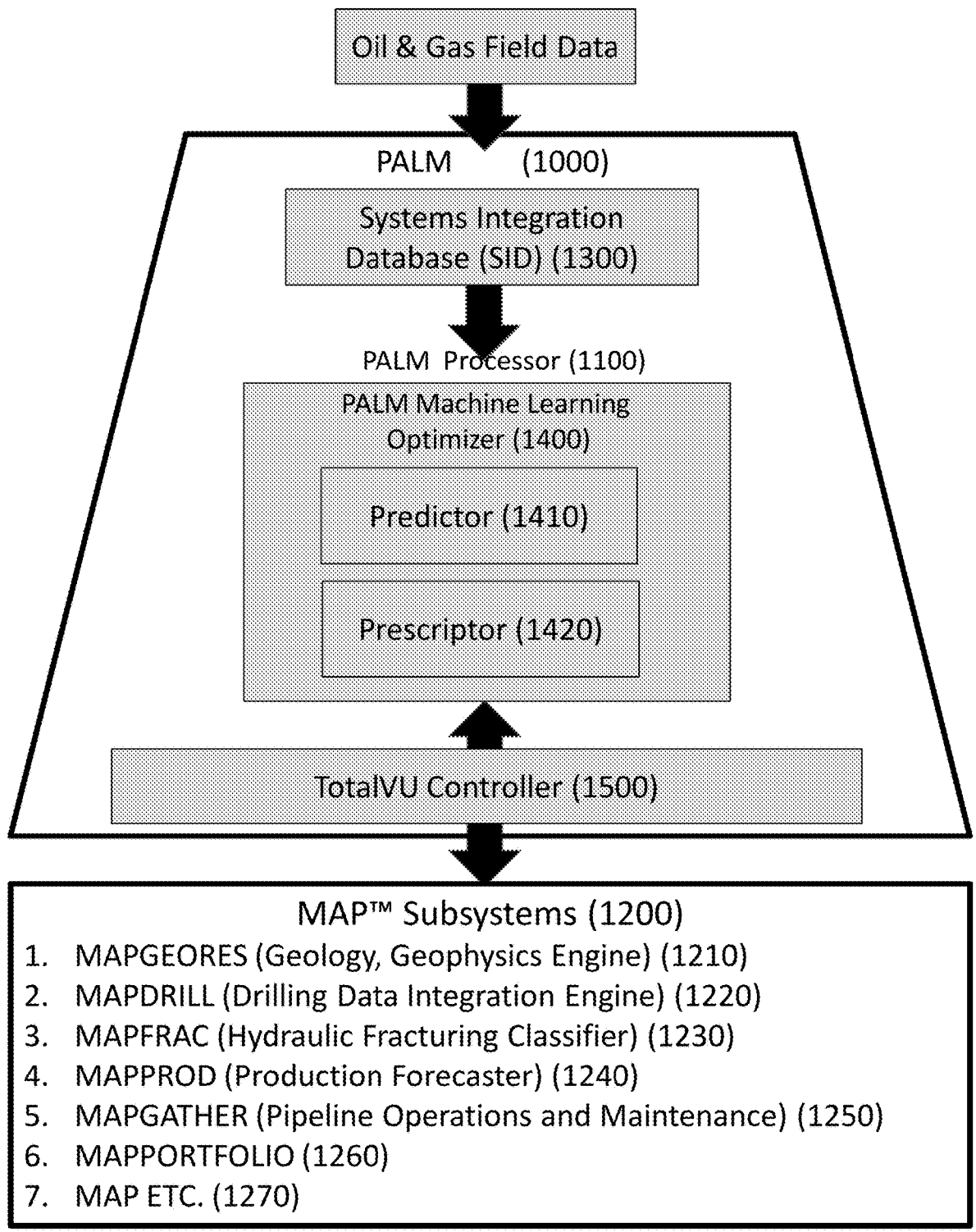
FIG. 2 is an illustration of the schematic flow of the PALM system in accordance with an exemplary embodiment of the claimed invention.

As shown in FIG. 2, in accordance with an exemplary embodiment, the PALM system 1000 feeds data to and archives analyses results from MAP 1200 subsystems, including but not limited to: MAPGEORES 1210, MAPDRILL 1220, MAPFRAC 1230, MAPPROD 1240, MAPGATHER 1250 and MAPPORTFOLIO 1260. The PALM Processor 1100 comprises a Machine Learning optimizer that predicts future results and prescribes actions to improve performance, and interacts with the operator via the TotalVU controller 1500 and its associated user interface.

In accordance with an exemplary embodiment of the claimed invention, the MAPGEORES 1210 is a geologic, geophysical, rock properties, and reservoir modeling engine that scores the Importance Weights calculated by the Machine Learning Optimizer 1400. Specifically, the predictor 1410 and prescriptor 1420 of the Machine Learning Optimize 1400 uses an ensemble of cluster and classification analyses in order to predict maximum production before a well is produced to the surface.

In accordance with an exemplary embodiment of the claimed invention, the MAPDRILL 1220 is a real-time drilling data integration engine that optimizes drilling to match the designed pathway of the well including hitting one or more landing zones, while minimizing sinuosity of horizontal and non-vertical components of the drilled well.

In accordance with an exemplary embodiment of the claimed invention, the MAPFRAC 1230 is a real-time hydraulic fracture classifier used to control the class of hydraulic fractures (FracClass) stage-by-stage, onsite or off. MAPFRAC 1230 uses the FracClass classification system of the claimed invention to predict the optimal mixture of perfect fracture stages (not good for production if all stages of a horizontal lateral length are perfect, a surprise discovery of the claimed invention), versus the class of frac's that deliver late stage sand placement more effectively to the near wellbore. Inventors discovered that more than 25% of these imperfect frac's out produced perfectly frac'ed wells in our reduction-to-practice example. Other FracClasses identified by the PALM system 1000 deal with the inevitable surface and wellbore mechanical failures that occur in order to make decisions when to abandon a costly frac to minimize losses.

In accordance with an exemplary embodiment of the claimed invention, the MAPPROD 1240 is a production forecaster that convolves the actual attribute values of hundreds to thousands of attributes coming into the system from historical wells, as well as each new well as it progresses, to maximize production for all wells in a play. The result, as controlled by the actions recommended by the PALM 1100 processor, is the optimization of the production of oil, natural gas, and natural gas liquids while minimizing water production (a cost) over time.

In accordance with an exemplary embodiment of the claimed invention, the MAPGATHER 1250 integrates the pipeline field data from gathering pipelines and production facilities, a real-time system for optimizing maintenance and pigging schedules, while minimizing liquids dropout in order to maximize fluid and gas throughput of the pipeline gathering system.

In accordance with an exemplary embodiment of the claimed invention, the MAPPORTFOLIO 1260 manages the efficient frontier of costs versus benefits for each well, field, play or company, and the MAP ETC. 1270 is a subsystem or an application engine specifically built to address a particular situation or customized for a specific customer's need or requirement.

Turning now to FIG. 3, in accordance with an exemplary embodiment, there are listed machine analytics algorithms and tools commonly accessible to all MAP 1200 subsystems within the PALM 1000. The Machine Learning Optimizer 1400 computes adaptive stochastic control, locally sensitive hashing, and MapReduce parallelization in Hadoop. Unstructured Analyses 1401 extract, retrieve and mine information from text, perform entity and pattern recognition, log-rank, perform keyword extraction, semantic analysis, knowledge discovery, sentiment analysis and noisy text processing. A Clustering Predictor 1410 computes K-means, K-medoids, region growing, and non-parametric modeling. A Regression Predictor 1411 computes linear and support vector regression, and classification and regression trees (CART). A Feature Selector 1412 computes and ranks Importance Weights, Chi-square goodness of fit, Fischer score probabilities, principal component analysis (PCA), and contains various wrapper methods. An Ensemble Prescriptor 1420 computes bagging, mountain climbing optimization, boosting of aggregate classifiers, random forest decision trees, and gradient boosters. A Classification Prescriptor 1421 computes logistic regression, support vector machines, K-Nearest neighbor, Decision tree modeling, and Neural networks and Deep learning. A Time Series Prescriptor 1422 computes Multivarieant time series, Hidden Markov models, and non-parametric Bayesian models.

Figure 4:
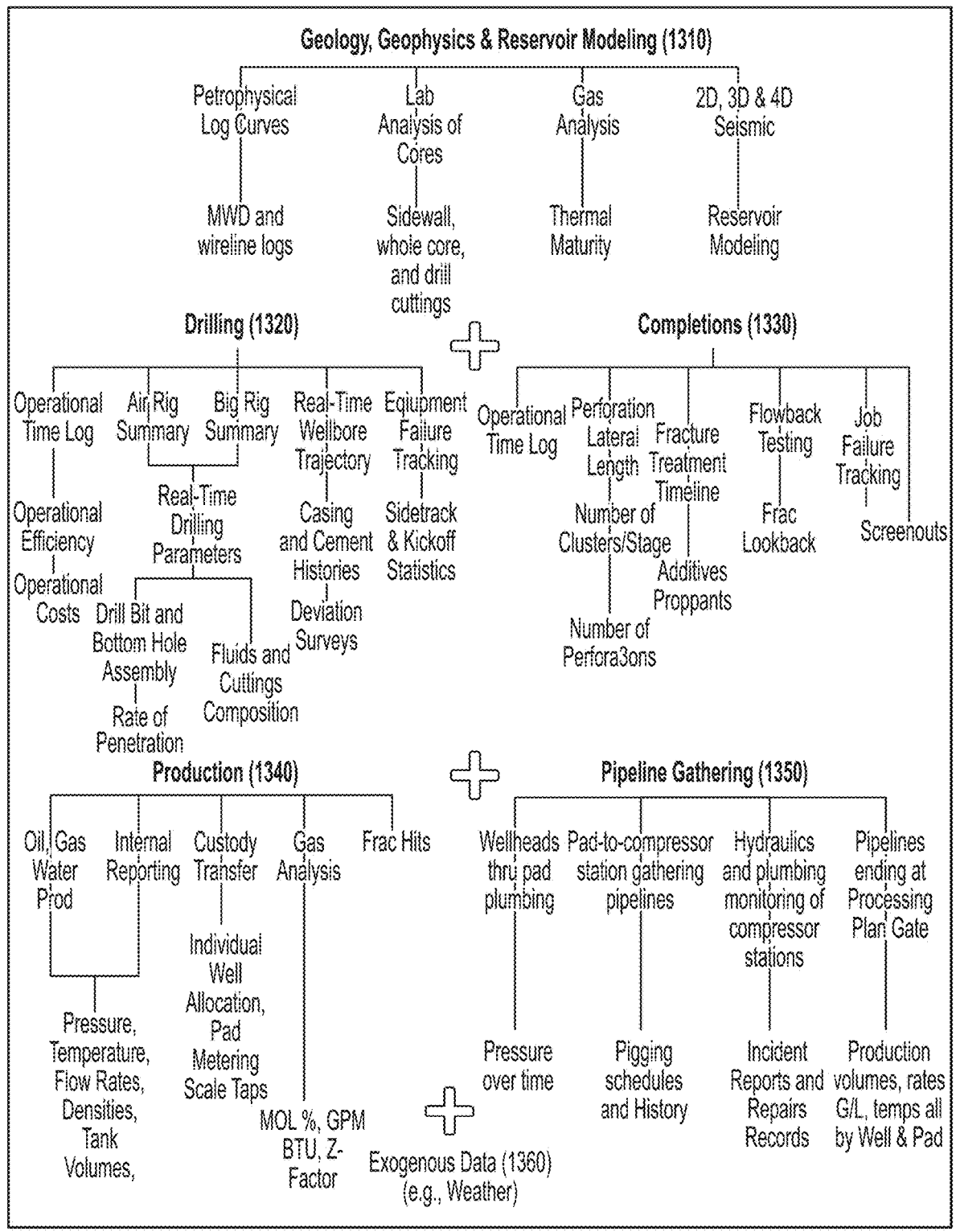
FIG. 4 is a schematic illustration of various data from geology, geophysical, reservoir modeling, drilling, completions including the hydraulic fractures, production, pipeline gathering and exogenous systems that are integrated into the System Integration Database, in accordance with an exemplary embodiment of the claimed invention.

In accordance with an exemplary embodiment of the claimed invention, as shown in FIG. 4, the system integration database (SID) 1300 is the central data repository for all data sources. The SID is a multi-architectural data center that incorporates components of different database technologies. One component is based on relational database management system (DBMS), which is for the traditional structured column based data management. The SID 1300 also features a NoSQL data management, which provides a mechanism for storage and retrieval of data not only in tabular relations. For example, textual data, such as PDFs, image data such as frac's, audio and video data can be analyzed via the NoSQL architecture for storage, and efficient retrieval. An example NoSQL database is MongoDB. Another component of the SID 1300 is a distributed file system. In the petroleum industry, terabytes of data are generated every day, such as time series hydraulic fracture data, well log and measurement-while-drilling data, and sensor data that monitors production and delivery to processing plants. How to store these data, and make use of such large-scale data poses a challenge in this domain. A distributed file system facilitates the storage and maintenance of the data, and provides efficient data computations and analytics. For example, Hadoop is a framework that allows for the distributed storage of data and distributed processing of large data sets across clusters of computing resources. A component of the SID 1300 makes use of Hadoop distributed file system (HDFS) for data storage, and MapReduce techniques for further data learning and computation. The large-scale data analytics in oil and gas benefit from the recent development of big-data technologies. Hadoop ecosystem is a framework that is based on the MapReduce algorithm for big data analytics. Hadoop distributed file system (HDFS) stores large-scale of data in a distributed network across computing clusters. Data computation is performed on each computing node in the Map step, and an intermediate output is combined to perform a global computation in the Reduce step. Among many components in the Hadoop Echosystem that can be applied in the oil and gas domain, Apache Hive is a data warehouse infrastructure built on top of Hadoop for providing data summarization, query, and analysis. The Apache Mahout provides an environment for quickly creating scalable machine learning applications.

Within the SID 1300, in accordance with an exemplary embodiment of the claimed invention, geology and geophysical data 1310 include 2D, 3D & 4D seismic data and interpretations such as the location and form of faults, anticlines, synclines, fractures, stratigraphic features, integrated well logs and areal maps. Rock property data include landing zone targets, target interval, target height, thickness of sequences, landing sequence type, gas shows, core analyses, mudlogs. Well log and measurement-while-drilling log analysis are included, such as structures, thickness, formation identification, normalized curve data, gamma ray, effective porosity, density, resistivity, TOC (total organic carbon), water saturation, and gas in place data. Reservoir modeling inputs and outputs are included.

Within the SID 1300, in accordance with an exemplary embodiment of the claimed invention, drilling data 1320 include surveys such as MD (measured depth), inclination, azimuth, TVD (total vertical depth), VS (vertical steering), departure north south east west, DLS (dog leg severity), build, turn, parameters, such as WOB, ROP, torque, circulation rate, gamma ray, differential PSI, choke position, hook load, flow, alarm states, pump rates, pump stokes, build rate, block height, tank volumes, over pull, northing, easting, inclination, azimuth, rotary torque, trip speed, tank fill, walk rate, resistivity, rotary RPM, mud viscosity, mud weight, 3rd party gas, deviation from plan, formation density, and wellbore schematics, such as conductor casing depth, water casing depth, minimum casing depth, surface casing depth, production casing depth, float subs, float collars, float shoes, marker joints, cement design, displacement volume, additives type, and additives volume data.

Within the SID 1300, in accordance with an exemplary embodiment of the claimed invention, completions data 1330 include structured digital data such as fracture treatment, such as number of stages, landing zone for each fracture stage, fracture gradient, breakdown pressure, breakdown rate, min/max treating rates, min/max treating PSI (pounds per square Inch), ISIP (instantaneous shut-in pressure), stage phases, such as start/end date & time, fluid type, proppant density, slurry volume, cumulative slurry volume, clean volume, cumulative clean volume, proppant volume, start/end rates, start/end pressures, additive type, additive name, additive volume, and perforations, such as stage number, top perforation, bottom perforation, TVD (total vertical depth) of perforation, shot density SPF (shots per foot), shots planned, actual number of shots, cluster size, perforation diameter, phasing, charge size, penetration depth, gun size, charge type data. Unstructured textual data that the SID 1300 can incorporate includes mechanical tool information, well completion logs and schematics, lists of tool configurations put into wells for completion and production, sales orders with part numbers, technical limits of the tool string, and job logs (such as operator, data/time, activity, remarks, job number, sold to, billed to, plant, Purchase Order/Authorization For Expenditure number, shipped to, description, address, details, well Identifier, etc.).

Within the SID 1300, in accordance with an exemplary embodiment of the claimed invention, production data 1340 include gas analysis, such as BTU calculation, depletion (Z) factor, sample pressure, sample temperature, molar component percent, GPM (gallons per minute) measure, production estimates, such as daily gas, daily condensate, daily water, daily casing pressure, daily tub pressure, daily pad volume, condensate haul tickets, water haul tickets, tank gauges—top, tank gauges—bottom, and SCADA (supervisory control and data acquisition), such as gas rate, differential pressure, tubing pressure, casing pressure, ESD (emergency shutdown) alarms, separator pressures, choke position, LEL (lower explosive limit) readings, condensate density, water density, tank gauges—top, tank gauges—bottom, EBU Data, flash separation data, VRU (vapor recovery unit) data, battery voltage data.

Within the SID 1300, in accordance with an exemplary embodiment of the claimed invention, pipeline gathering data 1350 includes location, pipe size, topographical height, and size configuration, fluid and gas composition, and pigging history, as well as maintenance schedules, type, time, place, and result of all previous incidence reports and repair records by pipeline section and GPS location, compressor station and equipment, pigging data acquisition, liquids trapped by location and time, and all other relevant remotely and locally gathered operational SCADA data.

Within the SID 1300, in accordance with an exemplary embodiment of the claimed invention, exogenous data 1360 include primarily weather history and future forecasts.

Figure 5:
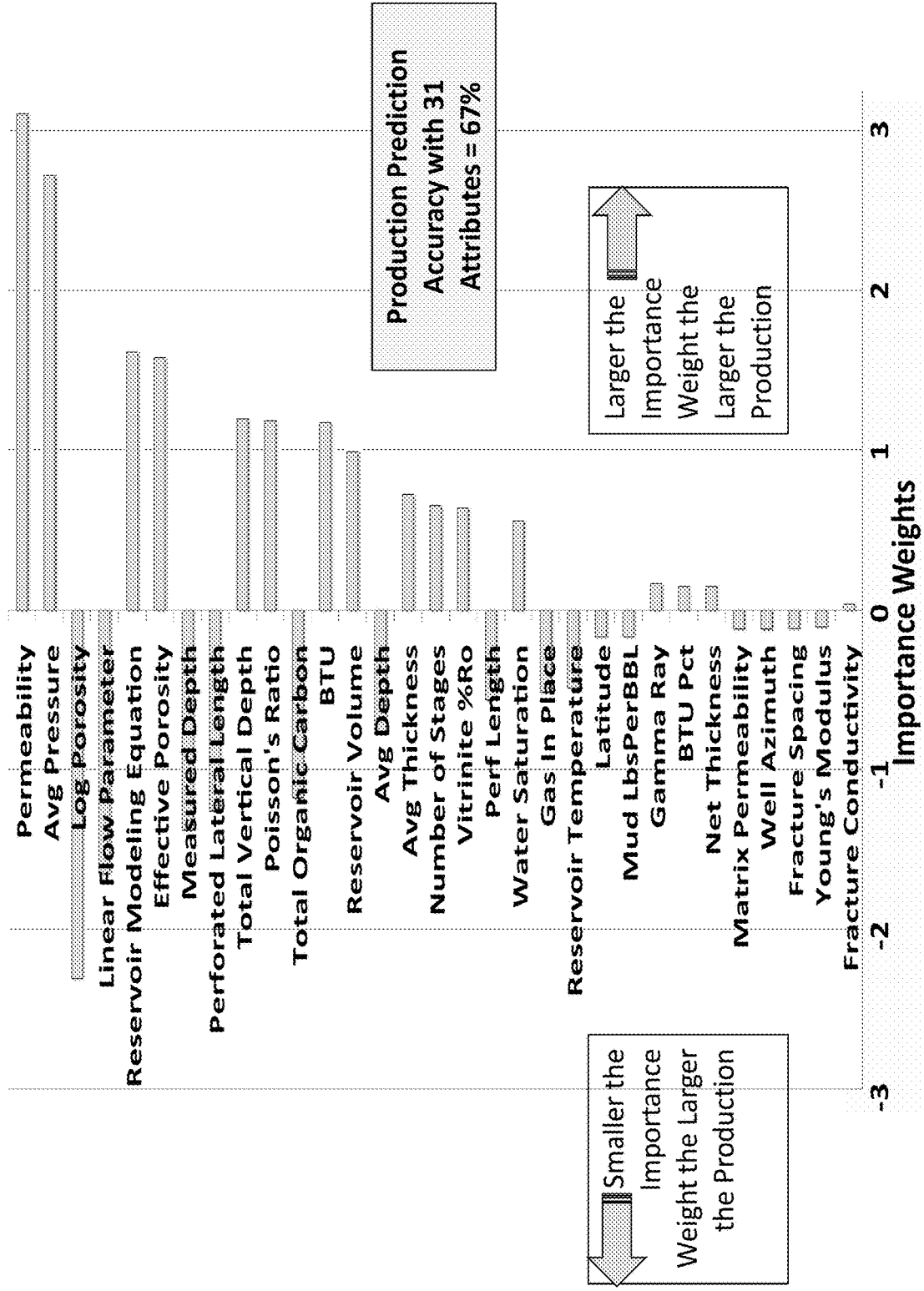
FIG. 5 is an illustration of the TotalVU dashboard that visualizes a MAPGEORES Tornado Diagram of Importance Weights in accordance with an exemplary embodiment of the claimed invention.

In accordance with an exemplary embodiment of the claimed invention, the MAPGEORES 1210 computes production forecasts entirely from geological, geophysical, rock property and reservoir simulation data known before the well is spudded. The tornado diagram of importance weights calculated by MAPGEORES 1210 as exemplary displayed by the TotalVU 1500 is shown in FIG. 5. The calculated importance weights are used by the PALM 1000 to predict production accuracy in accordance with an exemplary embodiment of the claimed invention. Appendix 1 is a list of attributes shown in FIG. 5 ranked by their importance weights calculated by MAPGEORES 1210 using Support Vector Regression. The prediction of production of oil, natural gas and water when Importance Weights were convolved with the same labeled attributes specific to each well were found to be 67% accurate using this initial set of geology, geophysics, rock properties, and reservoir modeling attributes.

The MAPGEORES 1210 utilizes machine learning of the historical structured data to compute Importance Weights for the attributes that represent all the data available before spud. The machine learning algorithms of the MAPGEORES 1210 uniquely combine the parameters of support vector and linear regression, allowing the construction of the Tornado diagrams, as exemplary shown in FIG. 5, to represent the Importance Weights of each attribute that correlates with a positive production prediction result (the bars to the right) and the importance of negative weights of each attribute that correlates with a positive production prediction result (the bars to the left). The predicted production is then compared to the actual production to derive an accuracy score. The future production accuracy is approximately 67% for the reduction-to practice shown in FIG. 5, whereas a random forecasting would be accurate only 50% of the time.

In accordance with an exemplary embodiment of the claimed invention, the MAPGEORES 1210 assembles a wide array of unstructured textual and image data (such as .pdf) to create additional attributes that are included in the machine learned ranking of Importance Weights, forming new attributes such as exemplary shown in Table 1.

TABLE 1

| Procedure for Progressive Clustering with Learned Seeds to Compute new Machine Learning Attributes | |
|---|---|
| 1. | Tree path extraction |
| 2. | Path scoring |
| 3. | Class contribution calculation |
| 4. | Seed points retrieval |
| 5. | K-Means clustering using retrieved seeds |

In accordance with an exemplary embodiment of the claimed invention, the MAPDRILL 1220 is a real-time synthesizer of the data coming into the SID 1300 during the drilling process, which can be 2000 or more data points each second. The MAPDRILL 1220 optimizes the drilling to match as closely as possible the designed pathway of the well including hitting one or more landing zones, while minimizing sinuosity of horizontal and non vertical components of the drilled well. In accordance with an exemplary embodiment of the claimed invention, the MAPDRILL 1220 minimizes the sinuosity of the horizontal component during the drilling of wells by monitoring and prescribing latitude, longitude and depth modifications to the inertial navigation steering mechanism. The larger the amplitude of the sinuosity of the horizontal well, or how much it deviates from the planned target path of the well, the more chances for liquids to pool in the valleys of the wellbore, which often can block the path of the liquids and gases to the surface. In accordance with an aspect of the claimed invention, the drilling console of a modern horizontal drilling rig receives data transmitted in near real-time from downhole, thereby allowing the driller to steer the horizontal well to prevent it from sinusoidal spiraling which can cause oil to have difficulty drilling to the surface.

Figure 6A:
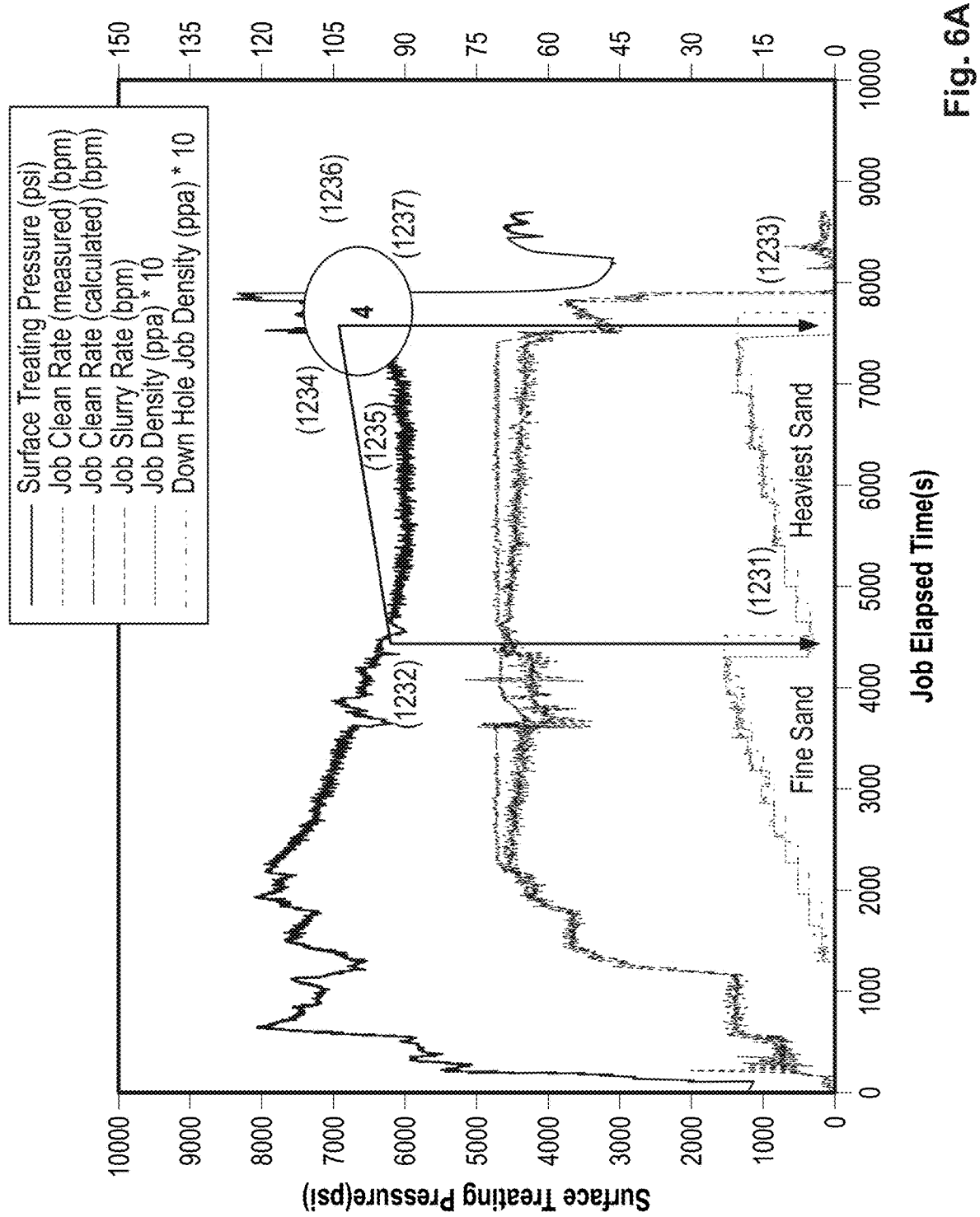

In accordance with an exemplary embodiment of the claimed invention, the automated classification of hydraulic fracturing data by the MAPFRAC classifier 1230 to isolate a FracClass 4 hydraulic fracture, as illustrated in FIG. 6A, that is struggling to inject the last of its heaviest proppant, compared to a more "perfect" FracClass 5 frac that did not inject enough of the heaviest sand and proppant to cause the late pressure rise, as illustrated in FIG. 6B. The inventors discovered that a mix of FracClass 4 and 5 is required to produce a most productive well.

improve the overall robustness and reliability of the model. These ensemble methods include Ada boost, random forest, gradient boosting machine, and other bagging, and boosting techniques. The MAPFRAC classifier 1230 executes a unique automated time series classification schema using machine learning feature recognition to develop clusters of hydraulic fracture classes unique to the claimed invention, and then correlates the abundance of stages of each class to highest production of each well, as shown in Table 2.

TABLE 2

Figure 7:
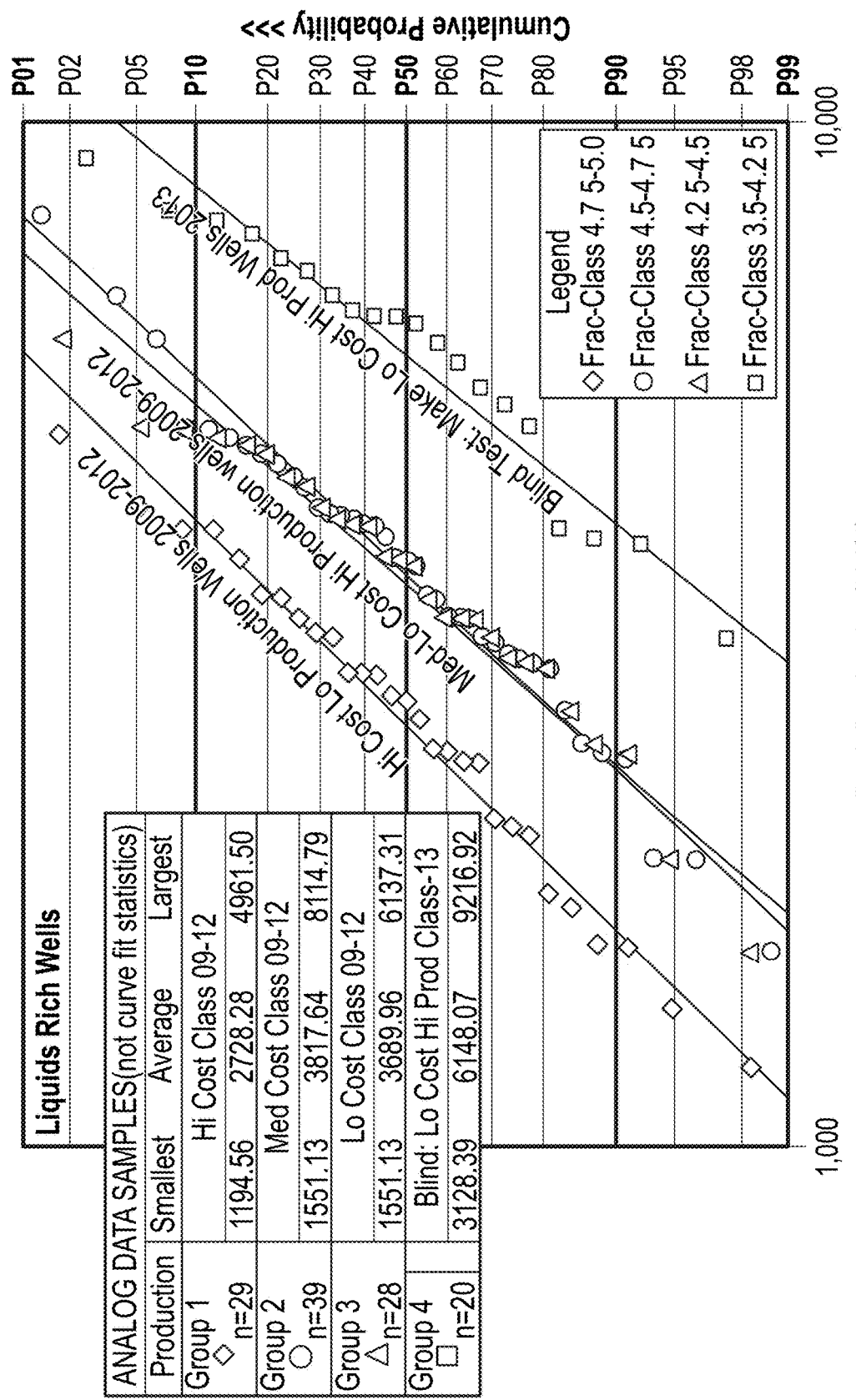
FIG. 7 is an illustration of a MAPFRAC result of intentionally increasing the FracClass 4 hydraulic fracture percentage per well in a drilling program in accordance with an exemplary embodiment of the claimed invention.

MAPFRAC Machine Learning Steps for FracClass Automated Classification of Hydraulic Fractures as illustrated in FIG. 7

(1231) Automatically select time of the beginning of sand change to heaviest sand proppant = timeheavysandstart.
(1232) Automatically select pressure percentile at beginning of heaviest sand density increase = % pressureheavysandstart.
(1233) Automatically select time of the density drop at the end of the heaviest sand injection = timedensitydropheavysandend.
(1234) Automatically select pressure percentile at the time of the end of the heaviest sand injection = % pressuredropheavysandend.
(1235) Automatically calculate the slope of the linear regression of the pressure from beginning of heaviest sand injection to the end of the heaviest sand injection = slopepressureheavysand.
(1236) Automatically calculate the intercept of the linear regression of the pressure at the end pressure of the heaviest sand injection = Interceptpressureheavysand.
(1237) Automatically assign a FracClass for each Hydraulic Fracture based upon whether the Slope (1235) at the Intercept (1236) is positive, wherewith the Hydraulic Fracture is assigned a classification of 4, representing a struggle to inject the last of the heaviest sand into the rock formation = FracClass 4, or
(1238) Automatically assign a FracClass for each Hydraulic Fracture based upon whether the Slope (1235) at the Intercept (1236) is zero to negative, wherewith the Hydraulic Fracture is assigned a classification of 5, representing no struggle to insert the last of the heaviest sand into the formation = FracClass 5.
(1239) Automatically calculate a statistical root mean squared scatter of the linear regression of the pressure from the beginning of heaviest sand injection to the highest pressure = rsquared.

MAPFRAC classifier 1230 utilizes machine learning methods to classify the wells to be those with highest production versus lowest production. Attributes for machine learning include data sources in addition to geology, geophysics, rock properties, reservoir simulation, such as landing zones, stress gradients and other hydraulic fracturing attributes we invented such as FracClass completion classes. The total oil, gas, condensate, and water production, and their normalized production by flow days, normalized for perforated lateral length, are used as response variables. Classification methods such as logistic regression, naïve Bayes, support vector machine, decision trees (e.g. CART, ID3, C4.5, CHAID), k-nearest neighbors, neural networks and deep learning networks are used by the MAPFRAC classifier 1230. Prediction accuracy, precision, and recall for each class are metrics used by the PALM 1000 to evaluate the production forecasting performance. Regression models such as linear regression, support vector regression, classification and regression trees (CART) can be also used by the MAPFRAC classifier 1230. R-Square, mean square error, among others, can be used to evaluate the regression performance. If a ranking is generated by the MAPFRAC classifier 1230 where the top of the rank list are high producing wells, and the bottom are low producing wells, receiver operating characteristic (ROC) curves and area under the ROC curve (AUC) are used to evaluate the ranking performance.

In accordance with an exemplary embodiment of the claimed invention, the ensemble methods that combine multiple classifiers can be used by the PALM 1000 to The claimed invention has solved the problem of not knowing what production comes from which hydraulic fracture, stage-by-stage, by automating a classification scheme that the MACFRAC classifier 1230 correlates with high versus low production using at least 150 historical wells and at least 2000 hydraulic fracture stages per play in shale oil and gas basins around the world. FracClass 1 in the claimed classification schema is an incomplete fracture attempt that must be removed from the analysis dataset. FracClass 2 fracs were either "Emergency Shut Downs" (ESD) because of surface equipment failures, frac jobs cut short for any surface reason such has lightning and bad weather, or equipment shutdown (SD) that resulted in a full job but not a successful frac. FracClass 3 fracs were successful, but only after re-perforations that were required by the sand sweep resulting in the whole wellbore being packed off with sand. The most successful FracClass 4 fracs occurred when more that one quarter of the stages in a horizontal well resulted in late injection pressure rises at the near wellbore due to struggles to place the full allotment of late sand proppant.

A majority of FracClass 4 fracs correlated with subsequent high well production, surprisingly. FracClass 4 fracs can be independently identified within the completions data by the real-time processor, the completions data comprising time series hydraulic fracture data including surface and downhole pressures, slurry compositions and water mixes, sand volumes and proppant weights, breakdown pressure, proppant concentrations and shut-in pressure for each hydraulic fracture. A time of a density drop that ends a first sand injection 1231 is one of the key attributes. A pressure percentile at the time of the first density drop 1232 is also one of the key attributes. A time of a density drop that ends a second sand injection with sand larger in diameter and heavier than the sand used in the first sand injection is one of the key attributes 1233. A pressure percentile at the time of the second density drop is one of key attributes 1234. A slope in the time of a pressure drop at an end of shut-in is one of the key attributes. Automatic calculation of the slope of the linear regression of the pressure from beginning of heaviest sand injection to the end of the heaviest sand injection at the end pressure of the heaviest sand injection 1235, and comparison to the end of the proppant injection 1236 ends the slope fit. Automatic assignment of a FracClass for each Hydraulic Fracture is based upon whether the Slope at the Intercept is positive 1237, wherewith the Hydraulic Fracture is assigned a classification of FracClass 4, representing a struggle to inject the last of the heaviest sand into the rock formation, or the Slope at the Intercept 1238 is zero to negative, wherewith the Hydraulic Fracture is assigned a classification of FracClass 5, representing no struggle to insert the last of the heaviest sand into the formation.

That is, a time of a beginning of a sand change from a lighter to the heaviest sand is one of the key attributes. A pressure percentile at beginning of a heaviest sand density increase is one of the key attributes. A time of a highest pressure after the sand change to the heaviest sand is one of the key attributes. A pressure percentile of a maximum heaviest sand change is one of the key attributes. A slope of a linear regression of a pressure from beginning to end of the heaviest sand injection is one of the key attributes. An intercept of the linear regression of pressure from the beginning of the heaviest sand injection to the highest pressure at the end of the heaviest sand injection is one of the key attributes. The measure of scatter of the linear regression of the pressure from the beginning of the heaviest sand injection to the highest pressure at the end of the heaviest sand injection from stage to stage is another of the key attributes.

The MAPFRAC classifier 1230 discovered that horizontal shale oil and gas wells with more than 75% "textbook perfect" FracClass 5 hydraulic fracture stages produce less oil and gas than wells with less than 75% of FracClass 5 fracs and more abundance of FracClass 3 and 4 hydraulic fracture stages produce more oil and gas. The MAPFRAC result of intentionally increasing the FracClass 4 hydraulic fracture percentage per well in a drilling program in 2013 versus the preponderance of more "perfect" FracClass 5 wells from the 2009-2012 drilling program is exemplary shown in FIG. 7. In fact, the PALM 1000 predicted up to 320% improvement in oil production by increasing the FracClass 4 hydraulic fractures. This discovery was made in wells completed from 2009 through 2012, as shown in FIG. 7, where there was an improvement from the high cost perfect FracClass 5 dominated wells (diamonds of group 1 inset), to the medium to low cost FracClass 3 and 4 dominated wells (circles and triangles of groups 2 and 3 respectively). The high cost label for Group 1 diamond wells was because the hydraulic fractures cost the same, but the production benefit was diminished when compared to the Group 2 medium cost circle wells and low cost triangle wells. Average production for the 29 high cost wells was 2600 bbl/day, but 3500 bbl/day for 39 medium cost wells and 3600 bbl/day for 28 low cost wells, as they produced from 2009-2012. In 2013, a concerted effort was made to drill a blind test of wells dominated by FracClass 3 and 4 hydraulic fracture stages (squares). Twenty wells produced an average of 6150 bbl/day, for a production performance improvement over the "perfect" wells of 225%.

Figure 8:
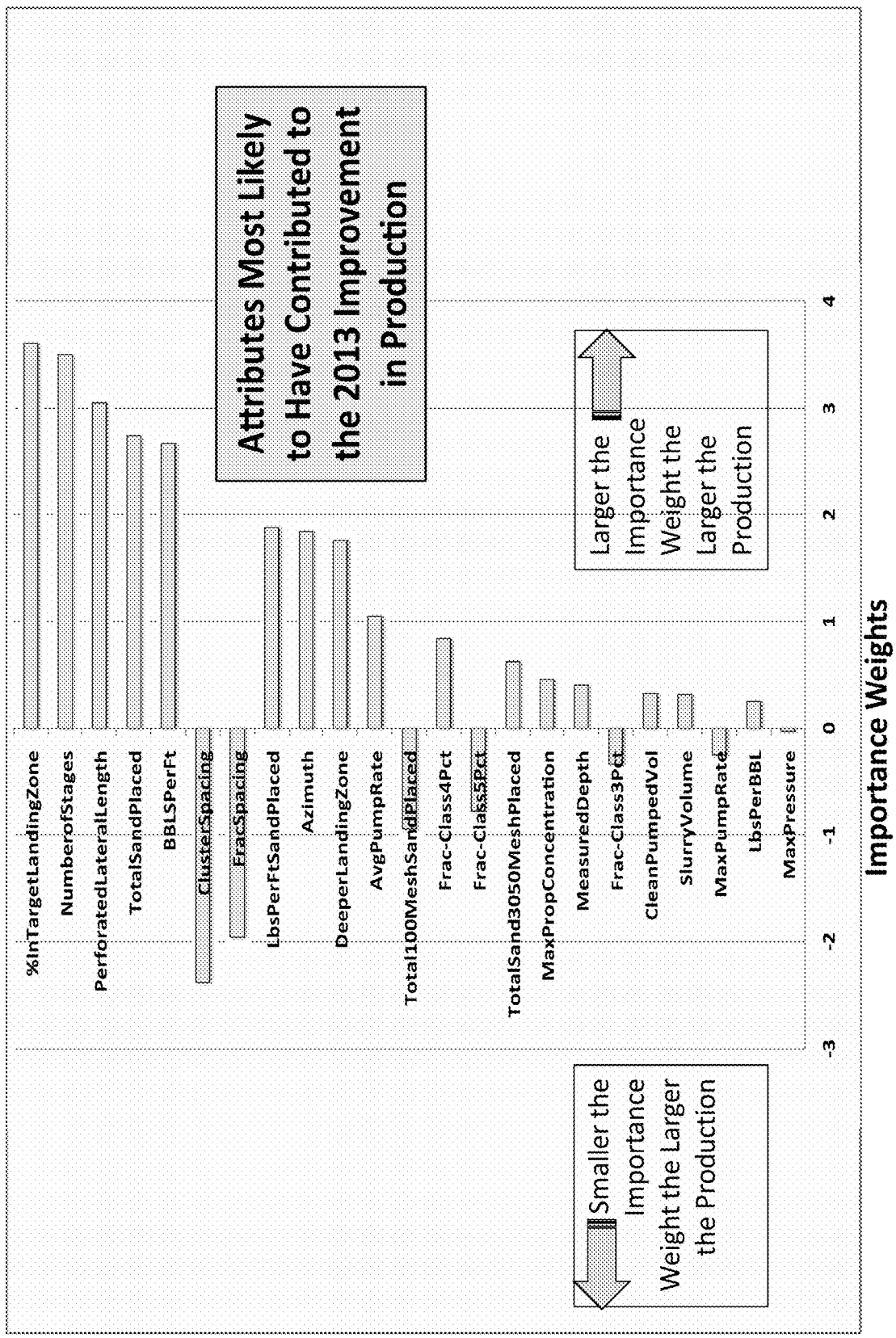
FIG. 8 illustrates a Tornado Diagram of the Importance Weights of MAPFRAC hydraulic fracture attributes that likely caused the production improvement in FIG. 7.

FIG. 8 illustrates a Tornado Diagram of the Importance Weights of MAPFRAC hydraulic fracture attributes that likely caused improvement in production for 2013 drill program shown in FIG. 7. Appendix 2 is a glossary of the top 20 attributes in FIG. 8. In accordance with an exemplary embodiment of the claimed invention, the MAPFRAC classifier 1230 identified improvements in production in 2013 by Importance Weights; better drilling into the targeted, deeper landing zone, a larger number of hydraulic fracture stages, longer perforated lateral length of the horizontal wells, and more total sand proppant injected into the formation during hydraulic fracturing, in that order. The FracClass 4 (the more the better) and FracClass 5 (the fewer the better) were ranked 13th and 14th most Important Weights, indicating they are dependent variables to the higher ranked independent variables listed above plus shorter perforation cluster and hydraulic fracture spacing used in 2013.

Figure 9:
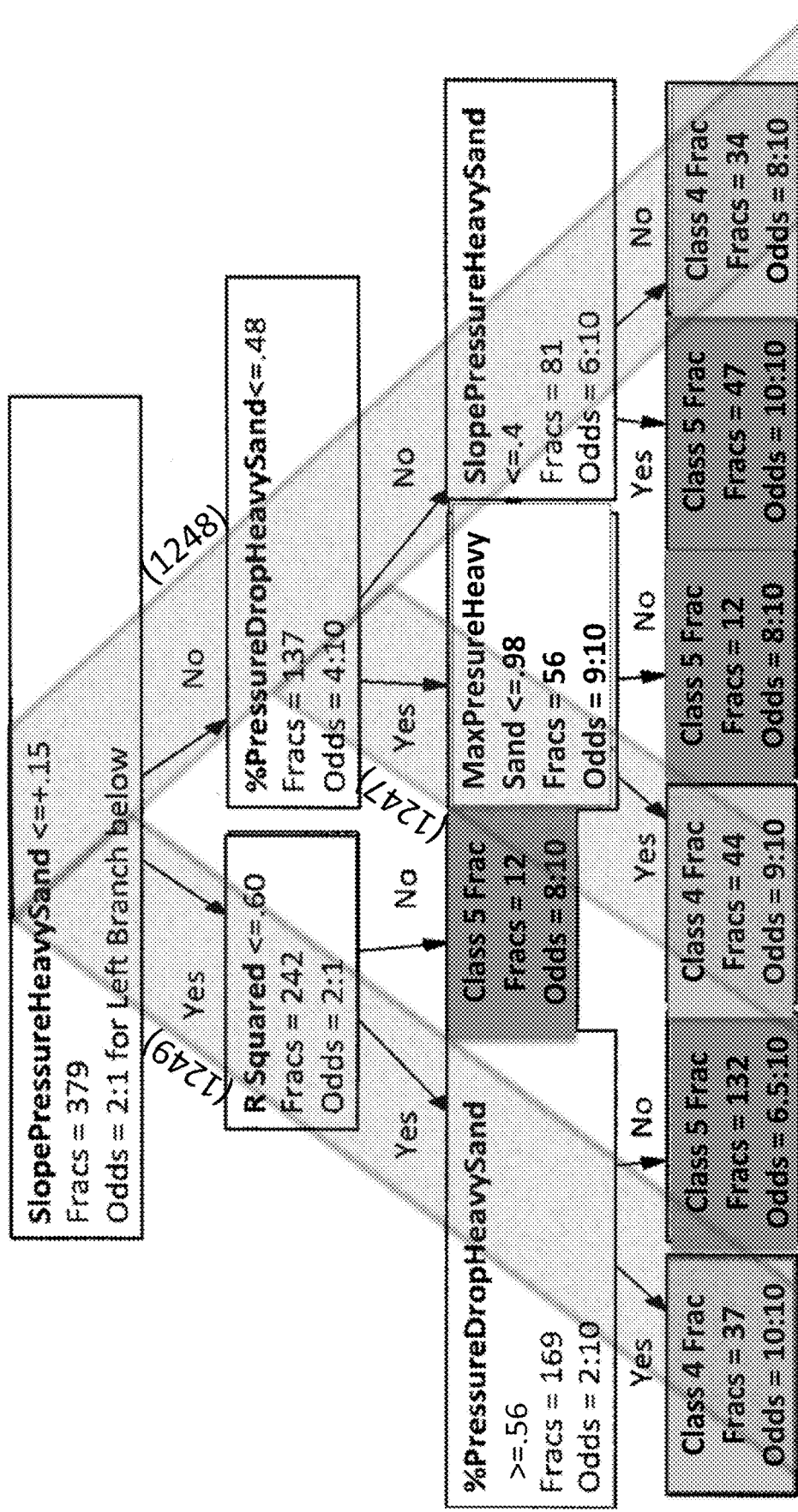
FIG. 9 illustrates a MACFRAC Decision Tree for arriving at a FracClass 4 versus FracClass 5 result during the hydraulic fracturing of successive stages of a horizontal shale oil well in accordance with an exemplary embodiment of the claimed invention.

In accordance with an exemplary embodiment of the claimed invention, as illustrated in FIG. 9, the steering of hydraulic fractures to the more advantageous FracClass 4 fracs can be controlled from the "Frac Control Center" in real time using Random Forrest decision trees calculated by the MAPFRAC classifier 1230, which recomputes the "yes/no, if/then" branching of the tree every few seconds during each new frac. The boxed paths in FIG. 9 predict how to make a FracClass 4 instead of a FracClass 5 dominated oil well mix, which produced a much higher volumes of oil in FIG. 8.

As each hydraulic fracture proceeds from light sand to heaviest sand proppant, first the slope of the pressure is monitored. Successful FracClass 4 fracs can be obtained whether the slope is equal to or less than 0.15, in which the left branches (1249, 1247) of the Decision Tree become critical, or the slope is greater than 0.15, in which the right branches are critical. If the frac follows the rightmost branches (1248) of FIG. 9, the percentage pressure drop during injection of the heaviest sand proppant then becomes critical. If the percentage is less than 48%, the tree branches to the left (1247), and maximum pressure of the heavy sand proppant injection must be kept less than 98%. A FracClass 4 will then have a 90% success rate. If the pressure increases to more than 100% of what it has been, then the odds for a FracClass 5 frac are greater than 80%. If the percentage pressure drop is greater than 48% however, the rightmost decision tree branches will be followed. Then the slope of the pressure of heaviest sand proppant injection must be maintained at <=40% in order to have an 80% chance of developing a FracClass 4 frac.

If the slope of the initial pressure of the heaviest sand proppant is less than 0.15, then there is a 2;1 chance that the leftmost branches (1249) in FIG. 9 will be followed. Then the percent pressure drop of the heaviest sand proppant injection must be kept higher than 56% in order to be certain of a FracClass 4 frac.

Figure 10:
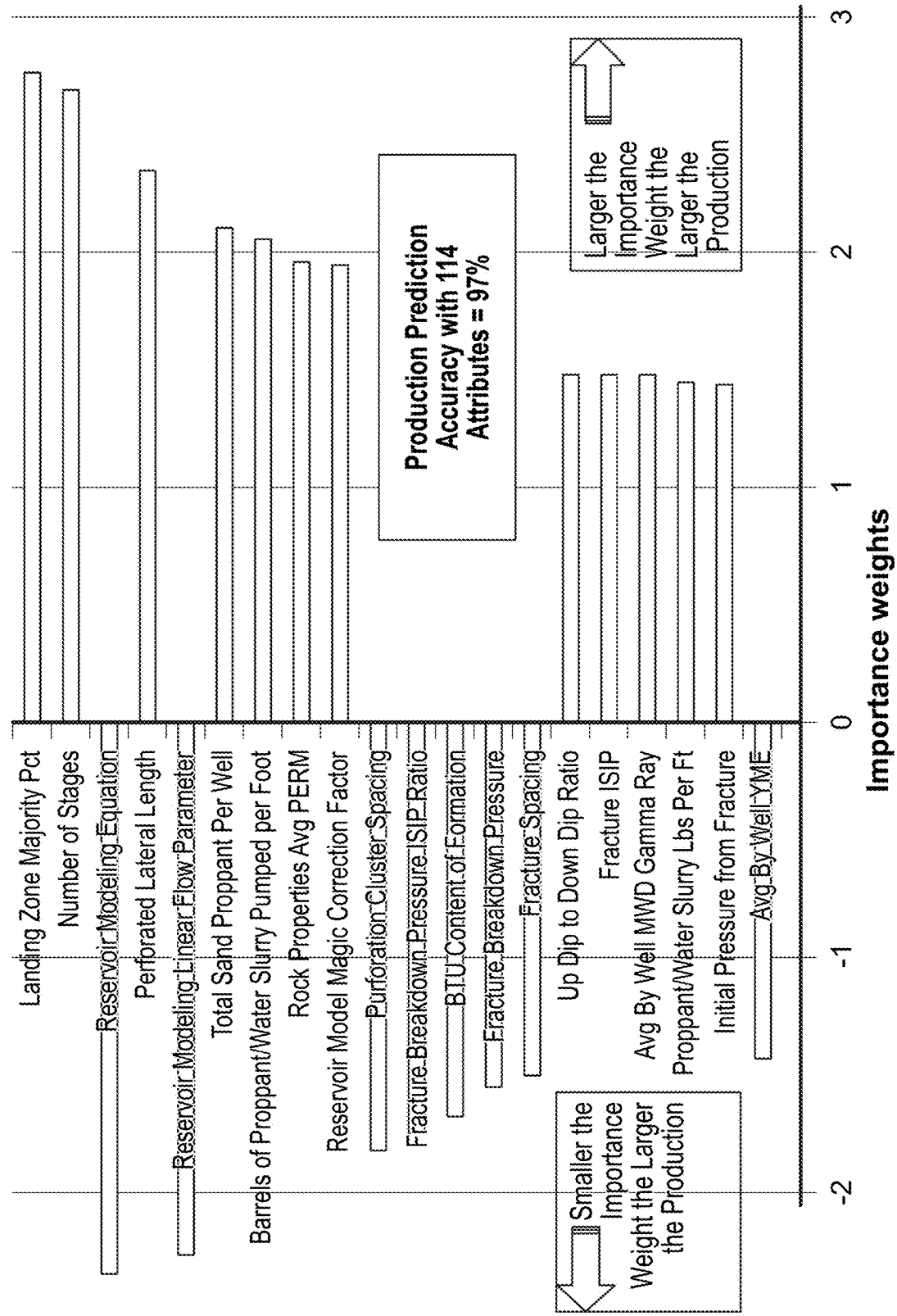
FIG. 10 is illustration of the MAPPROD Tornado Diagram of Importance Weights that predict oil, gas and water production using all of the attributes available before production of first oil to the surface in accordance with an exemplary embodiment of the claimed invention.

FIG. 10 is illustration of the MAPPROD Tornado Diagram of Importance Weights that predict oil, gas and water production using all of the attributes available before production of first oil to the surface in accordance with an exemplary embodiment of the claimed invention. The MADPPROD optimizer 1240 used 114 attributes available from the SID 1300, which achieved a production accuracy of 97% using historical data. Appendix 3 is a glossary of the 184 structured attributes and many more unstructured attributes used to select the 114 most important attributes for predicting production.

Figure 11A:
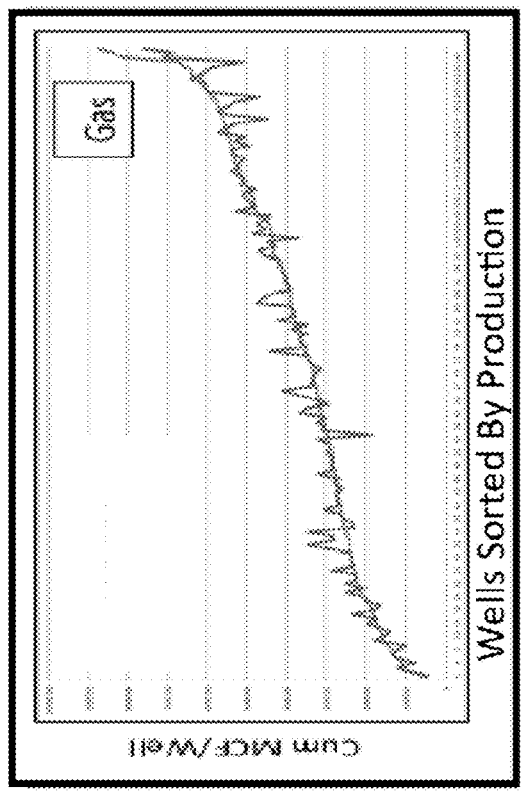
FIGS. 11A-D illustrate the MAPPROD predictions for oil, gas, and water production in accordance with an exemplary embodiment of the claimed invention.
Figure 11B:
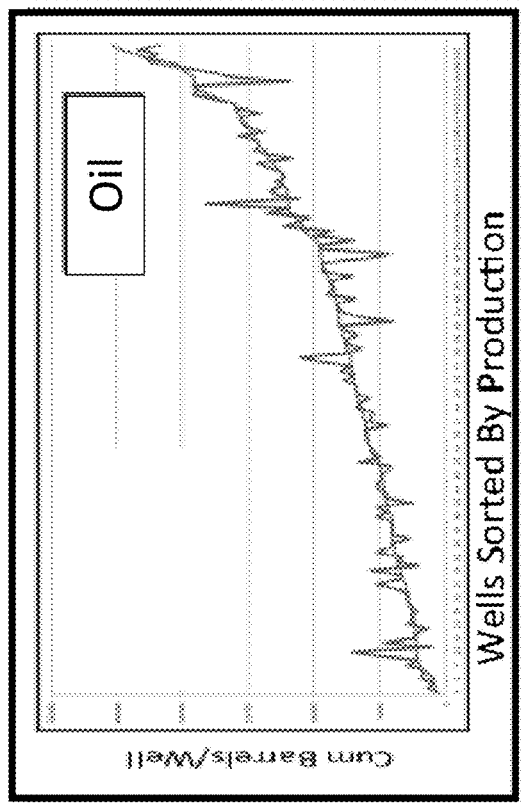
Figure 11C:
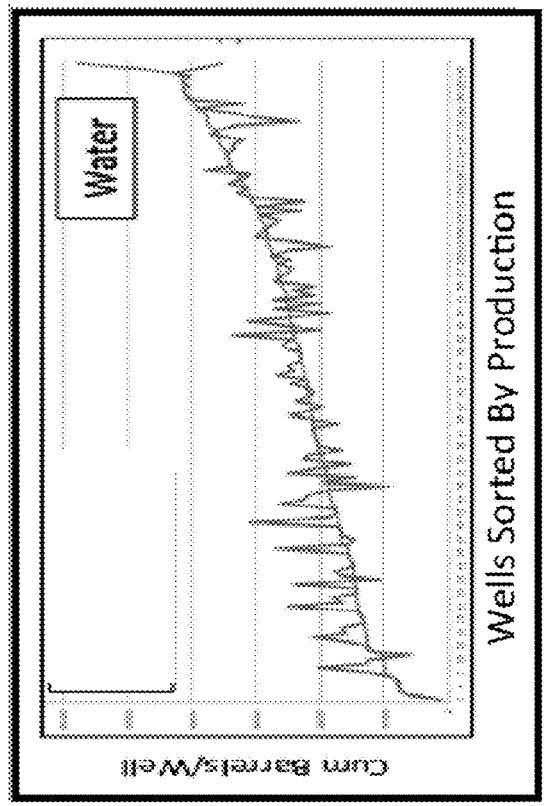

In accordance with an exemplary embodiment of the claimed invention, the MAPPROD optimizer 1240 uses a Machine Learning optimizer to compute the Importance Weights for the hundreds of multi-dimensional attributes that represent all the data available at each time as the well proceeds, from before spud, to after drilling and finally after completion. In accordance with an aspect of the claimed invention, Table 3 illustrates the Importance Weights of the 114 attributes in the reduction to practice study, combining the data common to all analyzed wells from the system integration database 1300, which contains 185 digitally structured attributes and numerous unstructured textual attributes defined in the glossary of Appendix 3. FIG. 10 illustrates the top 20 Importance Weights of Table 3. In accordance with an exemplary embodiment of the claimed invention, FIGS. 11A-C illustrate the Importance Weights of the 114 attributes, when convolved with the specific attributes of each well contributed to a Production Prediction for Oil, Gas, and Water of 97%+/−2.7%.

TABLE 3

The Importance Weights of the 114 attributes in the reduction to practice study.

| Rank | Attribute | Importance Weight |
|---|---|---|
| 1 | Landing Zone Majority Pct | 2.77 |
| 2 | Number of Stages | 2.69 |
| 3 | Reservoir Modeling Equation | −2.35 |
| 4 | FracLookback_Perforated Lateral Length | 2.35 |
| 5 | ReservoirModelingData_Linear Flow Parameter | −2.27 |
| 6 | FracLookback_Total Sand Per Well | 2.11 |
| 7 | FracLookback_BBLS Per ft | 2.05 |
| 8 | RockPropertiesAvg_Permeability | 1.95 |
| 9 | FracLookback_Res Model Correction Factor | 1.95 |
| 10 | FracLookback_Cluster Spacing | −1.83 |
| 11 | FracLookback_Breakdown Pressure/ISIP | −1.75 |
| 12 | FracLookback_BTU | −1.68 |
| 13 | FracLookback_Breakdown Pressure | −1.55 |
| 14 | ReservoirModelingData_Fracture Spacing | −1.51 |
| 15 | FracLookback_UpDip/DownDip | 1.48 |
| 16 | FracLookback_ISIP Instantaneous Shut In Pressure | 1.48 |
| 17 | StressGradientAvgByWell_MWD_Gamma Ray | 1.47 |
| 18 | FracLookback_Sand Lbs Per Ft | 1.44 |
| 19 | FracLookback_Initial Production | 1.44 |
| 20 | StressGradientAvgByWell_Youngs Modulus | −1.43 |
| 21 | RockPropertiesAvg_Porosity | 1.43 |
| 22 | FracLookback_Horizontal Well Azimuth | 1.42 |
| 23 | LandingPointFeatures_Landing Zone Std | 1.35 |
| 24 | RockPropertiesAvg_Temp_Max | −1.33 |
| 25 | LandingPointFeatures_Landing Zone Majority | 1.28 |
| 26 | LandingPointFeatures_Landing Zone Average | 1.27 |
| 27 | RockPropertiesAvg_Gas In Place | −1.23 |
| 28 | ReservoirModelingData_Scaling Factor | −1.21 |
| 29 | ReservoirModelingDataArea Stimulated/Reservoir Vol | −1.15 |
| 30 | FracLookback_Frac Gradient | 1.14 |
| 31 | FracLookback_Initial Production Per Cluster | 1.13 |
| 32 | StressGradientAvgByWell_Base Measured Depth | 1.08 |
| 33 | StressGradientAvgByWell_Measured Depth | 1.08 |
| 34 | StressGradientAvgByWell_Top Measured Depth | 1.07 |
| 35 | FracClassFeatures_FracClass Std | 0.99 |
| 36 | FracClassFeatures_Has FracClass 4 Majority | 0.98 |
| 37 | FracLookback_Has FracClass 5 Majority | −0.95 |
| 38 | RockPropertiesAvg_Water Saturation | −0.90 |
| 39 | ReservoirModelingData_Net Pay Thickness | −0.90 |
| 40 | RockPropertiesAvg_Total Organic Carbon | 0.86 |
| 41 | RockPropertiesAvg_Density | −0.84 |
| 42 | RockPropertiesAvg_BTU | 0.84 |
| 43 | LandingPointFeatures_Is In Landing Zone 1 | −0.81 |
| 44 | FracLookback_AvgRate | 0.81 |
| 45 | RockPropertiesAvg_Pressure | 0.79 |
| 46 | ReservoirModelingData_Number of Stages | 0.77 |
| 47 | RockPropertiesAvg_Vitronite Reflectance | 0.75 |
| 48 | RockPropertiesAvg_Gamma Ray | −0.70 |
| 49 | ReservoirModelingData_Skin | −0.69 |
| 50 | RockPropertiesAvg_Porosity Log | −0.66 |
| 51 | ReservoirModelingData_Initial Gas Saturation | −0.66 |
| 52 | RockPropertiesAvg_Longitiude | −0.66 |
| 53 | StressGradientAvgByWell_Longitude | −0.65 |
| 54 | LandingPointFeatures_Is In Landing Zone II_b | 0.58 |
| 55 | FracClassFeatures_FracClass 5 Pct | −0.57 |
| 56 | FracClassFeatures_FracClass 4 Pct | 0.57 |
| 57 | RockPropertiesAvg_Youngs Modulus | 0.57 |
| 58 | ReservoirModelingData_Reservoir Temperature | −0.48 |
| 59 | FracLookback_Small Proppant Design | −0.47 |
| 60 | LandingPointFeatures_IsIn Landing Zone III_a | 0.47 |
| 61 | FracClassFeatures_FracClass 4 And Above Pct | 0.45 |
| 62 | FracLookback_Avg Pressure | −0.44 |
| 63 | LandingPointFeatures_Is In Landing Zone III_b | −0.42 |
| 64 | FracLookback_Breakdown Rate | 0.41 |
| 65 | RockPropertiesAvg_Avg Porosity | −0.41 |
| 66 | LandingPointFeatures_Is In Landing Zone II_a | 0.38 |
| 67 | StressGradientAvgByWell_Total Vertical Depth/_Perf | 0.38 |
| 68 | RockPropertiesAvg_Depth | −0.37 |
| 69 | StressGradientAvgByWell_Depth | −0.36 |
| 70 | FracLookback_Max Proppant Conc | 0.35 |
| 71 | FracLookback_BTU Attribute | −0.35 |
| 72 | RockPropertiesAvg_Measured Depth | 0.31 |
| 73 | RockPropertiesAvg_TVD Horizontal | −0.30 |
| 74 | StressGradientAvgByWell_Poisons Ratio | 0.30 |
| 75 | FracClassFeatures_FracClass Average | −0.29 |
| 76 | FracClassFeatures_FracClass 3 Pct | −0.26 |
| 77 | RockPropertiesAvg_Vitronite_Reflectance by Zone | −0.26 |
| 78 | FracLookback_Clean Vol | 0.25 |
| 79 | FracLookback_Slurry Vol | 0.24 |
| 80 | FracClassFeatures_Has FracClass 2 | 0.24 |
| 81 | LandingPointFeatures_Is In Landing Zone II_c | 0.24 |
| 82 | LandingPointFeatures_Is In Landing Zone I | −0.22 |
| 83 | ReservoirModelingData_Corerection Factor | −0.22 |
| 84 | ReservoirModelingData_EffectivePorosity | −0.22 |
| 85 | LandingPointFeatures_Is In Landing Zone I_c | 0.21 |
| 86 | FracLookback_Max Slurry Rate | −0.19 |
| 87 | FracLookback_Water Lbs Per BBL | 0.19 |
| 88 | FracLookback_Large Proppant Design | 0.18 |
| 89 | ReservoirModelingData_Fracture Conductivity | 0.18 |
| 90 | FracLookback_Avg Sand Per Stage | 0.16 |
| 91 | FracLookback_Volume 100 Mesh | −0.14 |
| 92 | FracClassFeatures_FracClass Majority | −0.12 |
| 93 | ReservoirModelingData_Matrix Permeability | −0.11 |
| 94 | RockPropertiesAvg_Landing Zone Thickness | 0.09 |
| 95 | FracClassFeatures_FracClass 2 Pct | −0.09 |
| 96 | FracClassFeatures_FracClass 3 Pct | 0.08 |
| 97 | FracLookback_Volume Sand 30/50 | 0.07 |
| 98 | FracLookback_Fluid Design | −0.06 |
| 99 | FracClassFeatures_Frac Class Majority Pct | −0.06 |
| 100 | FracClassFeatures_Has FracClass 4 | 0.03 |
| 101 | RockPropertiesAvg_Latitude | −0.02 |
| 102 | FracLookback_Max Pressure | −0.02 |
| 103 | StressGradientAvgByWell_Latitude | −0.02 |
| 104 | StressGradientAvgByWell_Stress Grad | 0.01 |
| 105 | RockPropertiesAvg_Porosity/Resistivity | −0.01 |
| 106 | ReservoirModelingData_Perforated Lateral Length | 0.00 |
| 107 | LandingPointFeatures_Is In Landing Zone I | 0.00 |
| 108 | LandingPointFeatures_Is In Landing Zone III_c | 0.00 |
| 109 | LandingPointFeatures_Is In Landing Zone II_c | 0.00 |
| 110 | LandingPointFeatures_Is In Landing Zone I_c | 0.00 |
| 111 | LandingPointFeatures_Is In Landing Zone I_b | 0.00 |
| 112 | LandingPointFeatures_Is In Landing Zone I_a | 0.00 |
| 113 | LandingPointFeatures_Is In Landing Zone IV | 0.00 |
| 114 | FracLookback_Fluid Pct Design | 0.00 |

In accordance with an exemplary embodiment of the claimed invention, the MAPPROD optimizer 1240 convolves the Importance Weights for all wells in each study area f with g which is each attribute value specific to the well for which future production of oil, gas and water is being calculated, wherein f*g is an integral transform of the product of the two functions as attributes specific to that well under study. The integral transform then predicts the future production of the well under study before the oil and gas are delivered to the surface and uses future production to calculate an accuracy of that initial forecast.

Figure 11D:
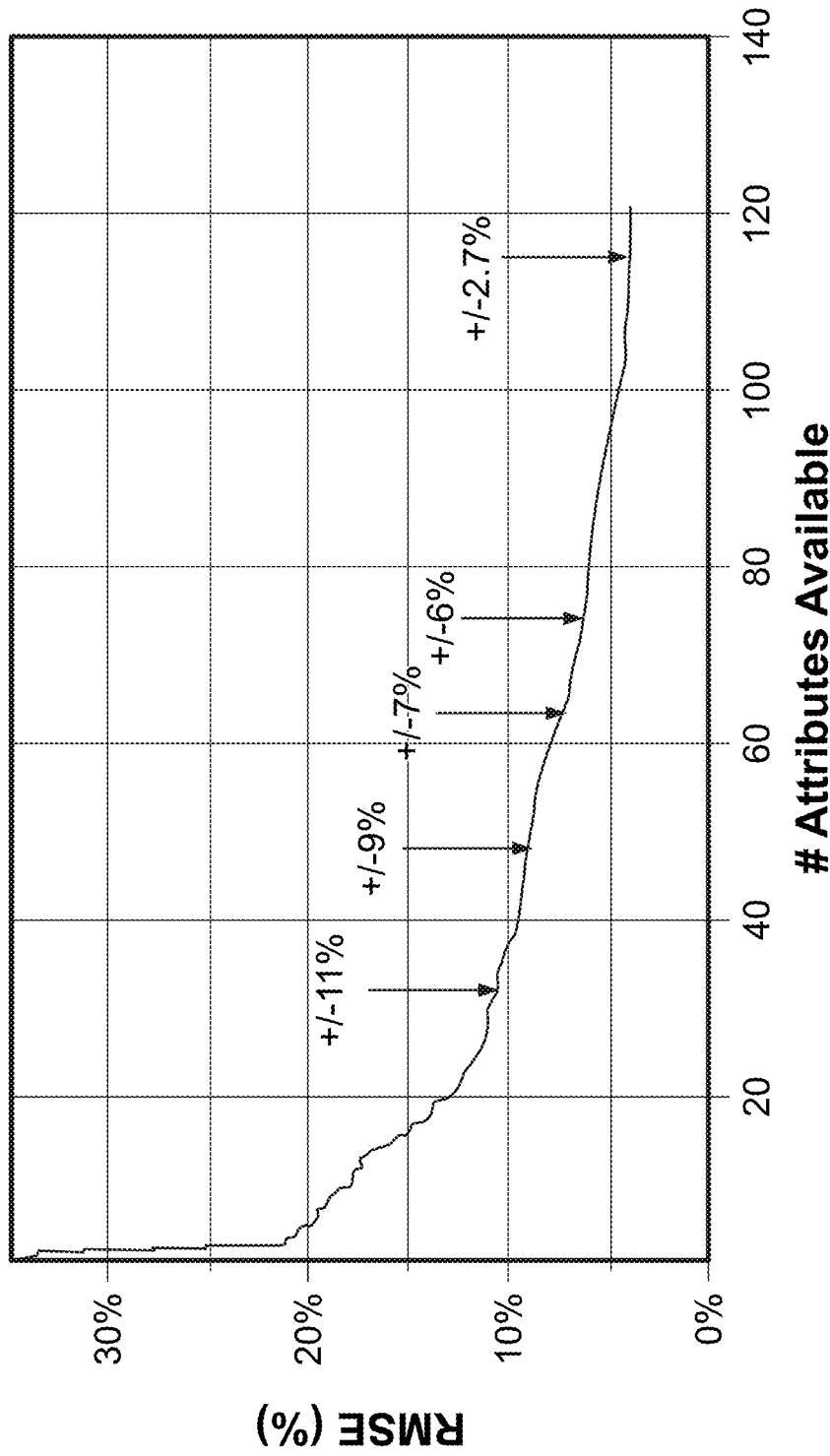

FIGS. 11A-D illustrate the MAPPROD predictions for oil, gas, and water production using the dataset of 0 Root Mean Square accuracy varied from +/−2.7% for 114 attributes to +/−11% for 32 attributes. In accordance with an exemplary embodiment of the claimed invention, as shown in FIGS. 11A-C, the MAPPROD optimizer 1240 convolved the Importance weights using the 114 attributes in Table 3 with the 156 wells in the reduction to practice dataset, resulting in production predictions for oil, gas and water that were found to be 97% accurate compared to the initial forecast. As shown in FIG. 11D, the Root Mean Square Error (RMSE) of the predicted versus actual production forecasts increased from +/−11% for 32 MAPGEORES attributes, to 9% for 45 MAPGEORES plus MAPDRILL attributes, to 7% for 62 MAPFRAC added attributes, to 6% when FracClass attributes were added, and finally to 2.7% when all resulting attributes that were available before first oil was produced to the surface.

Figure 12:
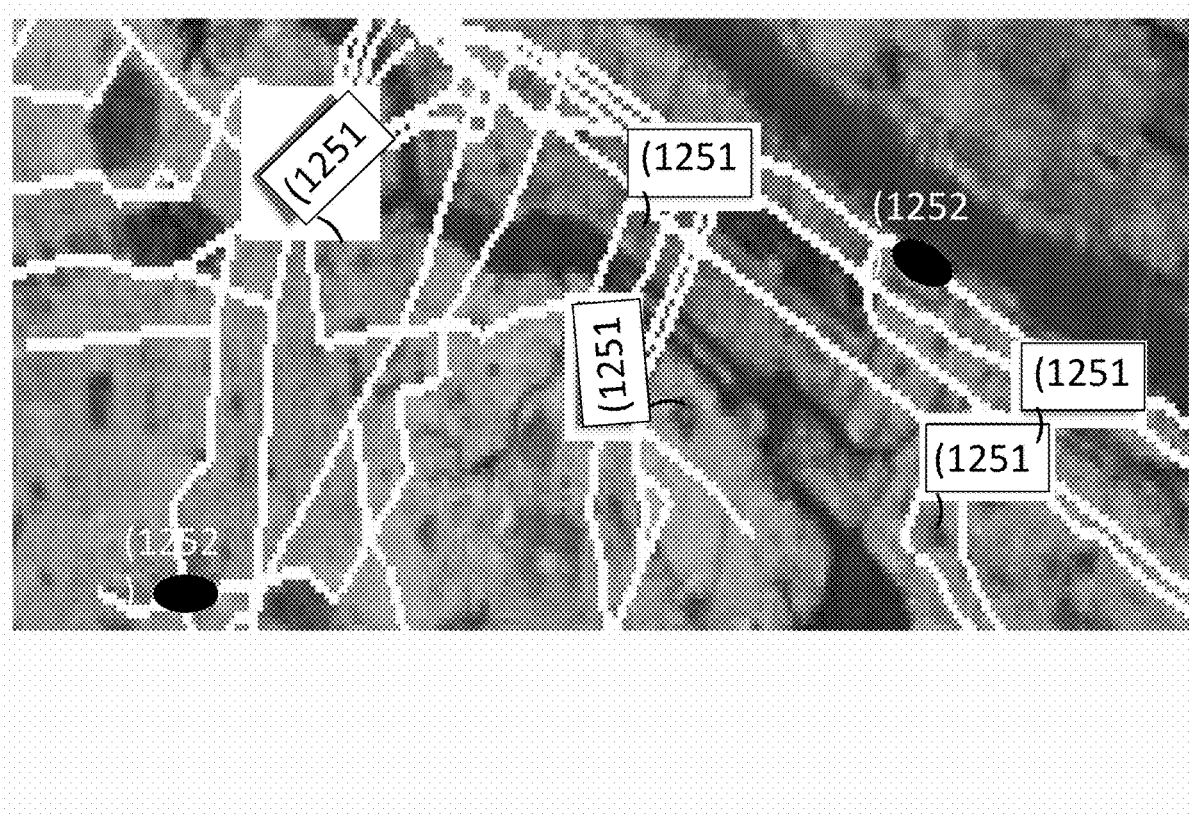
FIG. 12 is an illustration of the MAPGATHER optimizer for pipeline gathering systems performance improvement, including compressor station maintenance monitoring and "Pigging" scheduling of most needed flow paths, in accordance with an exemplary embodiment of the claimed invention.

As exemplary shown in FIG. 12, the pipeline gathering system 1600 is critical to deliver the production to market, the MAPGATHER analytic engine 1250 correlates cause-and-effect events between producing wells, production pads and pipeline gathering and compression station events 1251 that might be mitigated by preventive maintenance, day-ahead forecasts of available gathering system capacity, and changes to loops that may be created within the gathering system to alleviate congestion and prevent choke points. This information can be conveyed automatically by self-driving, autopilot and/or other autonomous means to the controller for management of the pipeline gathering system.

For compressor stations 1251 within the pipeline gathering system 1600, the MACGATHER analytic engine 1250 continuously analyzes clusters of correlation in compressors, engines, and separator performances, and prescribes maintenance routines that need to be changed. In accordance with an exemplary embodiment of the claimed invention, the MAPGATHER analytic engine 1250 provides an analytical solution that analytically analyzes the effects of weather on incidence reports, day and night scheduling, inspections, etc. and automatically conveys this information by self-driving, autopilot and/or other autonomous means to the controller for management of the pipeline gathering system. The MAPGATHER analytic engine 1250 generates a composite Tornado plot for seasons, wet versus dry and hot versus cold. Forecasting of day-ahead and week-ahead pipeline gathering system capacity by the MAPGATHER subystem 1250 leads to the identification of maintenance that will prevent the need to shut-in wells because of excessive gathering system capacity. The MAPGATHER analytic engine 1250 ranks section by section of good to bad performing pipeline sections (by section) allows forecasting of susceptibility to liquids trapping, actual versus planned pigging success, witches hat problem events before they happen, and condensate restrictions needed to reduce actual/predicted production.

As exemplary shown in FIG. 12, the pipeline gathering system 1600 may not be pigging optimally. In accordance with an exemplary embodiment of the claimed invention, the MAPGATHER analytic engine 1250 predicts, and then prescribes better pigging schedules. For example, the MAP-GATHER analytic engine 1250, detects predictable pressures that build up repeatedly at specific locations 1252 because of too much liquids accumulation in topographic low points that are prescribed for higher levels of Pigging surveillance. This information is automatically conveyed by self-driving, autopilot and/or other autonomous means to the controller for management of the pipeline pigging system.

In general, various omissions, modifications, substitutions and changes in the forms and details of the device illustrated and in its operation can be made by those skilled in the art without departing in any way from the spirit of the present invention. Accordingly, the scope of the invention is not limited to the foregoing specification, but instead is given by the appended claims along with their full range of equivalents.

APPENDIX 1

List of Attributes in FIG. 5, Ranked by their Importance Weights Calculated by the MAPGEORES Subsystem 1. Permeability
2. Average Pressure
3. Log Porosity
4. Linear Flow Parameter
5. Reservoir Modeling Equation
6. Effective Porosity
7. Measured Depth
8. Perforated Lateral Length
9. Total Vertical Depth
10. Poissons Ratio
11. Total Organic Carbon
12. British Thermal Units
13. Reservoir Volume
14. Average Depth
15. Average Thickness
16. Number of Stages
17. Vitrinite Reflectance
18. Perforation Length
19. Water Saturation

APPENDIX 2

Glossary of Top 20 Attributes in FIG. 7, Ranked by their Importance Weights Calculated by the MAPPROD Optimizer 1. Landing Zone Majority Pct=Highest percentage geological formation that the majority of the horizontal portion of the well landed in.
2. Number of Stages=The number of Hydraulic Fracture stages within the perforated lateral length of the horizontal portion of the wells.
3. Reservoir Modeling Equation=The fluid flow equation used by the Reservoir Simulator.
4. Perforated Lateral Length=Total length of the horizontal portion of the well that was perforated.
5. Linear Flow Parameter=Reservoir simulator estimate of the linear flow parameter.
6. Total Sand Per Well=Total sand proppant injected into the formation for each Hydraulic Fracture by stage.
7. Barrels of Proppant/Slurry pumped per foot=per Hydraulic Fracture stage.
8. Rock Properties Avg Perm=Average Permeability of the formation estimated from logs or measured from sidewall cores.

9. Reservoir Model Magic Correction Factor=Also known as MagicFR, is a linear correction to the Fluid Flow equation to scale it to the actual formation production performance.
10. Fracture Cluster Spacing=of all Hydraulic Fracture stages per well.
11. Breakdown Pressure to ISIP Ratio=Hydraulic Fracture breakdown pressure divided by Instantaneous Shut In Pressure after all treatments are completed.
12. BTU Content of Formation=British Thermal Units of combustible power of the hydrocarbons in the formation.
13. Fracture Breakdown Pressure=Pressure at which the Hydraulic Fracture was initiated in the formation.
14. Fracture Spacing=Estimated natural fracture spacing used by the Reservoir simulator.
15. Up Dip to Down Dip Ratio=of a sinuous horizontal portion of the well.
16. Fracture ISIP=Instantaneous Shut In Pressure of the Hydraulic Fracture at the end of the treatment as pressure is ramped down.
17. Avg By Well MWD Gamma Ray=Measurement While Drilling average of the Gamma Ray content of the formation in the horizontal portion of the well.
18. Proppant/Slurry Lbs Per Ft=Average Pounds per foot of Proppant/Water Slurry on each hydraulic Fracture stage.
19. Initial Pressure from Fracture=At the initiation of the hydraulic Fracture.
20. Avg By Well YME=Average Young's Modulus estimated from well logs and rock property measurements of cores and cuttings from the horizontal portion of the well.
21. Avg PHIE=Average Porosity from the resistivity log.

APPENDIX 3

Glossary of 184 Structured Attributes and List of More Unstructured Attributes Used by the MAPPROD Optimizer for Calculating Importance Weights to Predict Future Production to 97% Accuracy Geology, Geophysics, Rock Properties, and Reservoir Simulation
  Geology=British Thermal Units Target
  Geology=Depth
  Geophysics=Density
  Geophysics=Gas In Place
  Geology=Measured Depth Target
  Geology=Net To Gross Pay
  Geophysics=Permeability_
  Geophysics=Gamma_Ray
  Geophysics=Porosity
  Geophysics=Resistivity
  RockProperties=Poissons Ratio
  RockProperties=Pore Pressure
  RockProperties=Fluid Resistivity
  RockProperties=Water Saturation
  RockProperties=Temperature Max
  RockProperties=Thickness
  RockProperties=Total_Organic_Carbon
  RockProperties=Total Vertical Depth
  RockProperties=Planned Horizontal Length
  RockProperties=Latitude
  RockProperties=Longitude
  RockProperties=Youngs Modulus
  ReservoirModeling=Stimulated Reservoir Volume
  ReservoirModeling=Simulation Equation
  ReservoirModeling=Fracture Conductivity
  ReservoirModeling=Fracture Spacing
  ReservoirModeling=Net Thickness
  ReservoirModeling=Matrix Permeability
  ReservoirModeling=Linear Flow Parameter
  ReservoirModeling=Normalization Factor
  ReservoirModeling=Perforated Lateral Length
  ReservoirModeling=Effective Porosity
  ReservoirModeling=Initial Gas Saturation
  ReservoirModeling=Skin Thickness
  ReservoirModeling=Planned Stages
  ReservoirModeling=Reservoir Temperature
Drilling
  Drilling=Hole Depth
  Drilling=Rate Of Penetration
  Drilling=Bit Depth
  Drilling=Weight on Bit
  Drilling=Total Pump Output
  Drilling=Rotary Rotations Per Minute
  Drilling=Rotary Torque
  Drilling=Standpipe Pressure
  Drilling=Logging While Drilling Gamma Ray
  Drilling=$3^{rd}$ Party Gas
  Drilling=Flow Rate
  Drilling=Drilling Activity Report
  Drilling=Differential Pressure
  Drilling=Date and Time Report
  LandingPointFeatures=Is In Landing Zone I
  LandingPointFeatures=Is In Landing Zone II
  LandingPointFeatures=Is In Landing Zone III
  LandingPointFeatures=Is In Landing Zone I a
  LandingPointFeatures=Is In Landing Zone I b
  LandingPointFeatures=Is In Landing Zone I c
  LandingPointFeatures=Is In Landing Zone II a
  LandingPointFeatures=Is In Landing Zone II b
  LandingPointFeatures=Is In Landing Zone II c
  LandingPointFeatures=Is In Landing Zone III a
  LandingPointFeatures=Is In Landing Zone III b
  LandingPointFeatures=Is In Landing Zone III c
  LandingPointFeatures=Is In Landing Zone III d
  LandingPointFeatures=Is In Landing Zone III e
  LandingPointFeatures_=Zone Value Average
  LandingPointFeatures_=Zone Value Majority
  LandingPointFeatures_=Zone Value Majority Pct
Hydraulic Fracture Completions
  FracClassFeatures=FracClass1 Pct
  FracClassFeatures=FracClass2 And Above Pct
  FracClassFeatures=FracClass2 Pct
  FracClassFeatures=FracClass3 And Above Pct
  FracClassFeatures=FracClass 3 Pct
  FracClassFeatures=FracClass 4 And Above Pct
  FracClassFeatures=FracClass4 Pct
  FracClassFeatures=FracClass5Pct
  FracClassFeatures=FracClassAverage
  FracClassFeatures=FracClassMajority
  FracClassFeatures=FracClassMajorityPct
  FracClassFeatures=FracClassStd
  FracClassFeatures=Has FracClass1
  FracClassFeatures=Has FracClass2
  FracClassFeatures=Has FracClass3
  FracClassFeatures=Has FracClass4
  FracClassFeatures=Has FracClass5
  StressGradientAvgByWell=BaseMD
  StressGradientAvgByWell=Vertical Depth
  StressGradientAvgByWell=Measured Depth
  StressGradientAvgByWell=MWD_Gamma
  StressGradientAvgByWell=Pclgrad
  StressGradientAvgByWell=PR_c StressGradientAvgByWell=TopMD
StressGradientAvgByWell=TVD_Perf
StressGradientAvgByWell=X Latitude
StressGradientAvgByWell=Y Longitude
StressGradientAvgByWell=YME_STA
Frac=Volume 100 Mesh Sand Proppant
Frac=Avg Pressure
Frac=Avg Rate
Frac=Avg Sand Per Stage
Frac=Azimuth
Frac=BBLS Per ft
Frac=BD Per ISIP
Frac=Breakdown Pressure
Frac=Breakdown Pressure To Avg Pressure
Frac=Breakdown Rate
Frac=BTU
Frac=BTU Attribute
Frac=Clean Volume
Frac=Cluster Spacing
Frac=Fluid Design
Frac=Fluid Pct Design
Frac=Frac Gradient
Frac=Initial Pressure
Frac=Perfs Per Cluster
Frac=ISIP Instantaneous Shut In Pressure
Frac=Large Proppant Design
Frac=Lateral Length
Frac=Lbs Per BBL
Frac=Lbs Per Ft
Frac=Fracture Ratio
Frac=Max Pressure
Frac=Max PropConcentration
Frac=Max Rate
Frac=Volume Sand 30/50
Frac=SlurryVol
Frac=Small Prop Design
Frac=Number of Stages
Frac=Total Sand Per Well
Frac=UpDip/DownDip
Production
Production=BTU Calculation
Production=Z-Factor
Production=Sample Pressure
Production=Sample Temperature
Production=Molar Component Percent
Production=GPM (Gallons Per Minute) Measure for Condensate
Production=GPM (Gallons Per Minute) Measure for Water
Production=MCF (Thousand Cubic Feet Per Minute) Measure for Gas
Production=Production Estimates Gas
Production=Production Estimates Condensate
Production=Production Estimates Water
Production=Daily Gas
Production=Daily Condensate
Production=Daily Water
Production=Daily Casing Pressure
Production=Daily Tubing Pressure
Production=Daily Pad Volume
Production=Condensate Haul Tickets
Production=Water Haul Tickets
Production=Pad Tank Gauges—Top
Production=Pad Tank Gauges—Bottom
Production=Differential Pressure
Production=ESD (Emergency Shut Down) Alarms
Production=Separator Pressures
Production=Choke Position
Production=LEL (Lower Explosive Limit) Readings
Production=Condensate Density
Production=Water Density
Production=Flash Separation Data
Production=VRU (Vapor Recovery Unit) Data
Production=Battery Voltage data
Production=Other SCADA (Supervisory Control And Data Acquisition)
Pipelines
Pipeline=Pipe Size
Pipeline=Topographical Height
Pipeline=Size Configuration
Pipeline=Fluid and gas composition
Pipeline=Pigging data acquisition
Pipeline=Pigging history
Pipeline=Pigging maintenance schedules
Pipeline=Pigging maintenance type
Pipeline=Pigging maintenance time
Pipeline=Pigging maintenance place
Pipeline=Liquids trapped by location and time
Pipeline=Incidence reports
Pipeline=Repair records
Pipeline=GPS location for each pipeline section
Pipeline=Compressor stations
Pipeline=Pressure
Pipeline=Equipment
Pipeline=Engines
Pipeline=Separators
Pipeline=Compressor station tank level
Pipeline=Other SCADA data
Additional Unstructured Textual Data
Mechanical tool information
Well completion log and schematics (est. start, customer, well, sub-PSL, job BOM, sales order, job status, assigned, archived)
Mechanical well files that describe what was put in the wellbore to mechanically complete the well and at what depth were these tools placed
Sales order that connect to details and part numbers
Part numbers connect to technical limits of tools
Job log (operator, data/time, activity, remarks, job number, primary BOM, sold to, bill to, plant, Purchase Order/Authorization For Expenditure, ship to, description, address, details, well ID, etc.)

The invention claimed is:
1. A method for optimizing efficiency and gathering data from at least one energy source using an energy analytics learning machine system to maximize a payout from said at least one energy source while minimizing costs, for the producer, transporter, and/or consumer:
  collecting structured digital energy data and unstructured textual energy data from said at least one energy source, said at least one energy source being a real physical energy source or theoretically calculated system;
  receiving an incoming data stream over a communications network and storing the incoming data into a systems integration database by a processor based server or cloud based distribution of servers to provide collected energy data, the incoming data comprising digital exogenous data, real-time and historical endogenous data, historical data from surrounding physical or interrelated energy sources, and time-lapse progress, status and maintenance from new data sources over time including from public and private data sources;

recording a 3-dimensional spatial location and time-lapse 4-dimensional time-series for each data set of the collected energy data;

cleaning the collected energy data to eliminate extraneous and noisy data;

normalizing and storing the clean collected energy data;

processing the normalized energy data to determine clusters of correlation in multi-dimensional space to simultaneously identify a machine learned ranking of importance weights for each attribute of said at least one energy source;

ranking said importance weights, and identifying patterns to enhance the value of the collected energy data and the normalized energy data;

performing predictive analysis and prescriptive optimization on the normalized energy data to increase the payout from said at least one energy source and to reduce operational costs by utilizing machine learning and statistical algorithms, including at least two of the following: linear and non-linear support vector machine classifiers and regressors, decision trees, hidden Markov models, random forests, gradient boosting machines, Bayesian models, neural networks and deep learning networks, bagging and boosting ensemble models, feature selection, clustering, approximation and dynamic programming methods;

classifying unstructured textual energy data to correlate with optimal performance by utilizing progressive clustering with learned seeds, information extraction and retrieval, image recognition, text mining, keyword and key phrase extraction, semantic and sentiment analysis, entity and pattern recognition and knowledge discovery processing to capture the dynamics of said at least one energy source of physically real or theoretically calculated system to provide categorization results from labeled data sets to identify energy production and consumption patterns;

displaying data and analyses, transmitting recommendations, and receiving actual field actions and reactions on a graphical user interface on a network-enabled processing device over a communications network, the recommendations being based on the collected energy data from said at least one energy source, or one or more predicted conditions, communications with the one or more of the real or theoretical energy systems, autonomous and personalized to steer disparate data simultaneously to interpreters working on field or theoretical energy operations that are needed to improve future performance from said at least one energy source in response to one or more trends, said one or more predicted conditions, or recommendations displayed on the graphical user interface connected to the energy analytics learning machine system;

scoring and ranking the combined importance weights of attributes to predict maximum performance at minimum costs when convolved with specific attributes of said at least one energy source;

convolving importance weight values of attributes received by the energy analytics learning machine system from historical energy data and attribute data from each new energy source as it progresses in real time to predict future performance of said each new energy source before actual results are delivered to the energy analytics learning machine system;

utilizing the 4-dimensional time-series attributes during each time-lapse stage to automatically classify performance effectiveness of said each time-lapse stage and provide recommendations to maximize future performance of said each new energy data source; and wherein the recommendations are directed autonomously to optimize the performance of said at least one energy source while minimizing costs over time.

2. The method of claim 1, wherein said at least one energy source being optimized is at least one of production, distribution and consumption of at least one of the following: oil, natural gas, liquid natural gas (LNG), and electricity generated by power plants, the power plants being nuclear, oil, coal, natural gas, solar, hydroelectric or wind.

3. The method of claim 1, wherein the payout from said at least one energy source is maximized while minimizing costs to at least one of the following: a producer, a transporter, a refiner and a consumer.

4. The method of claim 1, wherein all energy sources work within a similar though separately managed markets and regulators, said all energy sources being either co-located or located in different cities, counties, states or countries.

5. The method of claim 1, further comprising receiving data from digital field devices into the systems integration database; combining the received data with real time exogenous data comprising weather forecasts; feeding the historical data and the real-time data into a data cleaning system to recognize a quality of the combination with the received data from a comparison with historical performance of at least one of each digital field device and a data stream.

6. The method of claim 1, further comprising:

determining clusters of like correlations in one or more conditions that will likely result in a more productive energy source using the energy analytics learning machine system;

generating from machine learning predicted production, transportation or consumption volumes of said at least one energy source over time;

displaying identified trends and predicted production, transportation or consumption conditions;

alerting an operator when an anomaly between the predicted production, transportation or consumption conditions and observed field conditions arise to modify and report a modification of at least one of estimated ultimate optimization of efficiency, profitability and recovery from the energy analytics learning machine system; and wherein the energy analytics learning machine system has a coverage of multiple aspects in the analytics, including:

at least one of the following regressions: linear regression, support vector regression, regression trees, random forest regression, neural networks and deep learning networks;

at least one of the following classifications: logistic regression, support vector machines, nearest neighbors, decision trees and random forest, neural networks, and deep learning networks;

at least one of the following clustering methods: k-means, k-medoids, expectation-maximization, agglomerative clustering, and nonparametric Bayesian models;

at least one of the following feature selection and feature engineering processes: information gain, Chi-square, principal component analysis, and filter and wrapper feature selections;

at least one of the following ensemble methods: bagging, boosting, gradient boosting machine, and random forests;

at least one of the following time series analyses: autoregressive integrated moving average (AMNIA), generalized autoregressive conditional heteroskedasticity (GARCH), multivariate time series analysis, hidden Markov models, nonparametric Bayesian models; and at least one of the following large-scale or big data analyses: MapReduce, approximation, and locality sensitivity hashing.

7. The method of claim 6, further comprising recommending a cessation or abandonment of production, distribution or consumption of said at least one energy in response to a determination by the energy analytics learning machine system that anomalous conditions cannot be economically corrected.

8. The method of claim 1, further comprising receiving at least one of historical exogenous data, real-time exogenous data and the real-time endogenous data of said at least one energy source over a secure wireless or wired network, and wherein the historical exogenous data and the real-time exogenous data include at least one of historical weather data, forecast weather data, and production data from surrounding energy sources under similar historical conditions; and computing forecast of future product for said at least one energy source.

9. The method of claim 8, further comprising querying one or more systems integration databases of multiple surrounding energy sources in an area or querying one integrated master systems integration database comprising regionally relevant geologic and geophysical data, the historical exogenous data, the real-time exogenous data, and the real-time endogenous data to forecast production of said at least one energy source.

10. The method of claim 1, wherein a support vector regression is utilized to estimate relative importance weights of attributes inputted into the energy analytics learning machine system and a linear regression to assign a positive or negative correlation sign to product for each weight; and wherein the attributes comprise:

relevant geological and geophysical data;

combining parameters of the support vector regression and linear regression to enable construction of tornado diagrams representing visually the importance weights of each attribute that correlates with a positive production prediction result and the importance weights of each attribute that correlates with a negative production prediction result for all energy sources in the area or play.

11. The method of claim 10, f and g is convolved, where f is the importance weight values of attributes computed by the energy analytics learning machine system from historical data from all energy sources in the area or play and g is each attribute value specific to an energy source as it progresses; and wherein f * g is an integral transform of a product of two functions as attributes specific to said energy source, and the integral transform predicts the future production of said energy source, before commencement of said at least one energy source.

12. The method of claim 1, further comprising managing one or more prescriptive analytics calculations to maximize production of said at least one energy source while minimizing the costs by: computing multiple learning models operatively coupled to the systems integration database and receiving the collected energy data from the field in real time in an exit poll like voting procedure by the energy analytics learning machine system; generating at least one predicted condition by the energy analytics learning machine system; and storing resulting changes in operations in the system integration database from field operations in response to a recommended action.

13. The method of claim 1, further comprising computing a forecast for production of said at least one energy source for a duration of a productive history of said at least one energy source, before commencement of said at least one energy source; continuously monitoring and updating the production as said at least one energy source ages; and providing an estimated ultimate recovery modification recommendations when a deviation from a forecasted, estimated ultimate recovery is predicted.

* * * * *